(12) United States Patent
Li et al.

(10) Patent No.: US 9,940,664 B2
(45) Date of Patent: Apr. 10, 2018

(54) INFORMATION INPUT METHOD, ACCOUNT INFORMATION INPUT METHOD AND TERMINAL

(71) Applicant: Tencent Technology (Shenzhen) Company Limited, Shenzhen (CN)

(72) Inventors: Maocai Li, Shenzhen (CN); Chang He, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 384 days.

(21) Appl. No.: 14/588,826

(22) Filed: Jan. 2, 2015

(65) Prior Publication Data

US 2015/0186014 A1    Jul. 2, 2015

Related U.S. Application Data

(63) Continuation of application No. PCT/CN2014/083013, filed on Jul. 25, 2014.

(30) Foreign Application Priority Data

Dec. 30, 2013  (CN) .......................... 2013 1 0744318

(51) Int. Cl.
*G06Q 30/06*  (2012.01)
(52) U.S. Cl.
CPC ................. *G06Q 30/0641* (2013.01)
(58) Field of Classification Search
CPC .............. G06F 3/04842; G06F 3/0482; G06Q 30/0641

See application file for complete search history.

(56) References Cited

U.S. PATENT DOCUMENTS

2003/0069882 A1* 4/2003 Nieswand ......... G06F 17/30398
2014/0052607 A1* 2/2014 Park ..................... G06Q 40/025
705/38

FOREIGN PATENT DOCUMENTS

| CN | 1343061 A | 4/2002 |
|----|-----------|--------|
| JP | 2008276403 A | 11/2008 |
| JP | 2010117805 A | 5/2010 |

OTHER PUBLICATIONS

Tencent Technology, ISRWO, PCT/CN2014/083013, dated Nov. 3, 2014, 7 pgs.
Tencent Technology, IPRP, PCT/CN2014/083013, dated Jul. 5, 2016, 5 pgs.

* cited by examiner

*Primary Examiner* — Andrey Belousov
*Assistant Examiner* — Seth A Silverman
(74) *Attorney, Agent, or Firm* — Morgan, Lewis & Bockius LLP

(57) ABSTRACT

An electronic device for receiving an account identifier is described. The device includes display; one or more processors; and memory storing one or more programs. The device displays a user interface that includes an area for receiving an account identifier and a first set of candidates for a first set of characters. The device detects a selection of a first candidate of the first set of candidates. In response, the device displays characters in the first candidate in the area. The device, subsequent to detecting the selection of the first candidate, receives a manual input of each character in one or more sets of characters; and displays, in the area, characters in the one or more sets of characters concurrently with at least the characters in the first candidate. A corresponding method and a computer readable storage medium storing one or more programs for execution by the electronic device are also described.

12 Claims, 14 Drawing Sheets

| Payment account input | | | | |
|---|---|---|---|---|
| Account pre-selection information | AA bank (1111) | BB bank (1222) | CC bank (1333) | More... |

FIG. 4A

| Payment account input | 1 | | | |
|---|---|---|---|---|
| Account pre-selection information | AA bank (1111) | BB bank (1222) | CC bank (1333) | More... |

FIG. 4B

| Payment account input | 1111 | | | |
|---|---|---|---|---|
| Account pre-selection information | D region (2323) | E region (2324) | F region (2325) | More... |

FIG. 4C

| Payment account input | 1111 2 | | | |
|---|---|---|---|---|
| Account pre-selection information | D region (2323) | E region (2324) | F region (2325) | More... |

FIG. 4D

| Payment account input | 1111 2323 | | | |
|---|---|---|---|---|
| Account pre-selection information | Deposit card (6232) | Platinum card (7232) | International bank (9542) | More... |

FIG. 4E

| Payment account input | 1111 2323 6 | | | |
|---|---|---|---|---|
| Account pre-selection information | Deposit card (6232) | | | |

FIG. 4F

| Payment account input | 1111 2323 6232 |
|---|---|

FIG. 4G

| Payment account input | 1111 2323 6232 3888 |
|---|---|

1802 Display a user interface that includes an area for receiving an account identifier. The account identifier includes multiple sets of characters that do not overlap with one another.

1804 Display a first set of candidates for a first set of characters of the multiple sets of characters, each candidate in the first set of candidates comprising a plurality of characters 1806 Prior to detecting a selection of a first candidate of the first set of candidates, receive a manual input of one or more characters; and replace the display of the first set of candidates with a subset of the first set of candidates. Candidates in the subset correspond to the one or more characters.

1808 Prior to detecting the selection of the first candidate of the first set of candidates, determine that no candidate in the first set of candidates corresponds to the one or more characters; and, in accordance with a determination that no candidate in the first set of candidates corresponds to the one or more characters, forego display of any candidate of the first set of candidates 1810 The area for receiving an account identifier and the first set of candidates are concurrently displayed prior to detecting the selection of the first candidate 1812 Detect a selection of a first candidate of the first set of candidates for the first set of characters 1814 In response to detecting the selection of the first candidate of the first set of candidates for the first set of characters, display characters in the first candidate in the area for receiving an account identifier (A)

FIG. 18A

INFORMATION INPUT METHOD, ACCOUNT INFORMATION INPUT METHOD AND TERMINAL

RELATED APPLICATIONS

This application is a continuation application of PCT Patent Application No. PCT/CN2014/083013, entitled "INFORMATION INPUT METHOD, ACCOUNT INFORMATION INPUT METHOD AND TERMINAL" filed on Jul. 25, 2014, which claims priority to Chinese Patent Application Serial No. 201310744318.6, entitled "INFORMATION INPUT METHOD, ACCOUNT INFORMATION INPUT METHOD AND TERMINAL," filed on Dec. 30, 2013, both of which are incorporated by reference herein in their entirety.

TECHNICAL FIELD

The present application relates to the field of information input methods, and in particular to account information input methods.

BACKGROUND

With the continuous development and improvement of computer technologies, users may use terminal devices such as computers and mobile phones to carry out daily transaction processing (e.g., online payment or member card discount and relevant service upgrading). In the daily transaction processing, it is often necessary to manually enter account information (e.g., the bank card account, the member card account, etc.). Manually entering long account information is frequently fraught with input errors and requires repeated corrections, which is inconvenient and further affects the efficiency of completing transactions.

SUMMARY

The above-discussed technical problems are addressed by methods and systems described below.

In accordance with some embodiments, a method for receiving an account identifier is performed by an electronic device with display, memory and one or more processors. The method includes displaying a user interface that includes an area for receiving an account identifier, wherein the account identifier includes multiple sets of characters that do not overlap with one another. The method also includes displaying a first set of candidates for a first set of characters of the multiple sets of characters, each candidate in the first set of candidates comprising a plurality of characters; detecting a selection of a first candidate of the first set of candidates for the first set of characters; and, in response to detecting the selection of the first candidate of the first set of candidates for the first set of characters, displaying characters in the first candidate in the area for receiving an account identifier. The method includes, subsequent to detecting the selection of the first candidate of the first set of candidates for the first set of characters: receiving a manual input of each character in one or more sets of characters, wherein each set of the one or more sets of characters comprises a plurality of characters; and displaying, in the area for receiving an account identifier, characters in the one or more sets of characters concurrently with at least the characters in the first candidate.

In accordance with some embodiments, an electronic device for receiving an account identifier includes display; one or more processors; and memory storing one or more programs for execution by the one or more processors. The one or more programs include instructions for displaying a user interface that includes an area for receiving an account identifier, wherein the account identifier includes multiple sets of characters that do not overlap with one another. The one or more programs also include displaying a first set of candidates for a first set of characters of the multiple sets of characters, each candidate in the first set of candidates comprising a plurality of characters; detecting a selection of a first candidate of the first set of candidates for the first set of characters; and, in response to detecting the selection of the first candidate of the first set of candidates for the first set of characters, displaying characters in the first candidate in the area for receiving an account identifier. The one or more programs further includes, subsequent to detecting the selection of the first candidate of the first set of candidates for the first set of characters: receiving a manual input of each character in one or more sets of characters, wherein each set of the one or more sets of characters comprises a plurality of characters; and displaying, in the area for receiving an account identifier, characters in the one or more sets of characters concurrently with at least the characters in the first candidate.

In accordance with some embodiments, a computer readable storage medium stores one or more programs for execution by one or more processors of an electronic device. The one or more programs include instructions for displaying a user interface that includes an area for receiving an account identifier, wherein the account identifier includes multiple sets of characters that do not overlap with one another. The one or more programs also include displaying a first set of candidates for a first set of characters of the multiple sets of characters, each candidate in the first set of candidates comprising a plurality of characters; detecting a selection of a first candidate of the first set of candidates for the first set of characters; and, in response to detecting the selection of the first candidate of the first set of candidates for the first set of characters, displaying characters in the first candidate in the area for receiving an account identifier. The one or more programs further includes, subsequent to detecting the selection of the first candidate of the first set of candidates for the first set of characters: receiving a manual input of each character in one or more sets of characters, wherein each set of the one or more sets of characters comprises a plurality of characters; and displaying, in the area for receiving an account identifier, characters in the one or more sets of characters concurrently with at least the characters in the first candidate.

BRIEF DESCRIPTION OF THE DRAWINGS

The aforementioned features and advantages thereof as well as additional features and advantages thereof will be more clearly understood hereinafter as a result of a detailed description of embodiments when taken in conjunction with the drawings.

FIG. 4A is a schematic diagram illustrating operations of an account input method in accordance with some embodiments.

FIG. 4B is a schematic diagram illustrating operations of an account input method in accordance with some embodiments.

FIG. 4C is a schematic diagram illustrating operations of an account input method in accordance with some embodiments.

FIG. 4D is a schematic diagram illustrating operations of an account input method in accordance with some embodiments.

FIG. 4E is a schematic diagram illustrating operations of an account input method in accordance with some embodiments.

FIG. 4F is a schematic diagram illustrating operations of an account input method in accordance with some embodiments.

FIG. 4G is a schematic diagram illustrating operations of an account input method in accordance with some embodiments.

FIG. 4H is a schematic diagram illustrating operations of an account input method in accordance with some embodiments.

FIGS. 18A-18B illustrate a flow chart of an exemplary method for receiving an account identifier in accordance with some embodiments.

Like reference numerals refer to corresponding parts throughout the several views of the drawings.

DESCRIPTION OF EMBODIMENTS

Figure 1:
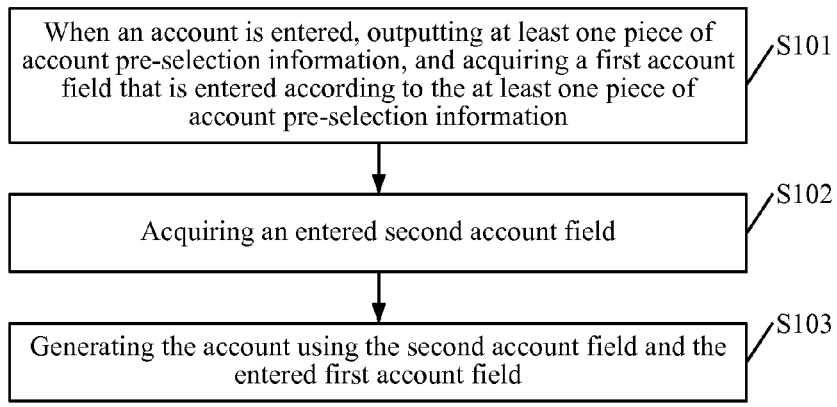
FIG. 1 is a flowchart of an information input method in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solution in the embodiments will be clearly and fully described below with reference to the accompanying drawings in the embodiments. It is obvious that the embodiments described are only exemplary embodiments. The embodiments described herein are not intended to limit the scope of claims.

Information input method in some embodiments described herein can be applied to a scenario where it needs to record account information. For example, in some embodiments, when account information is entered, at least one piece of account pre-selection information is output. A user terminal acquires a first account field that is entered according to the at least one piece of account pre-selection information, and acquires an entered second account field, and the user terminal generates the account using the second account field and the entered first account field. The input of the first account field can be accomplished just by providing account pre-selection information, which simplifies the account input process and improves the convenience of information input.

In some embodiments, the account identifier input methods described herein can be applied to scenarios where it is necessary to record an account number (e.g., a credit card number). For example, the method can apply to a scenario where it needs to record an account number to handle regular deductions, a scenario of real-time payment in on-line payment, etc. When an account number is entered, an account generation terminal outputs at least one piece of account pre-selection information, and acquires a first account field that is entered according to the at least one piece of account pre-selection information, and the account generation terminal acquires an entered second account field, and then generates the account number using the second account field and the entered first account field. The input of the first account field can be accomplished just by providing account pre-selection information, which simplifies the account number input process and improves the convenience of information input.

The user terminal and the account generation terminal involved in some embodiments comprise terminal devices such as a computer, a tablet PC, a smart phone, a laptop PC, a palm PC and a mobile interconnect device (MID). The account number may be a membership card number or a bank card account number issued by an account management mechanism. An account may be a transaction account issued by an account management mechanism (e.g., an account of a deposit card of XX bank, an account of a membership card of XX shop, etc.). Account pre-selection information is preset account prompt information. In some embodiments, prefixes of account numbers follow a fixed rule that is used when each account management mechanism issues the accounts (e.g., the bank card account). In some embodiments, the prefixes of account numbers of the same type of bank card accounts issued by the same account management mechanism at the same branch are identical. In some embodiments, postfixes of account numbers of the same type of bank card accounts issued by the same account management mechanism at the same branch are different from one another. In some embodiments, a first account field corresponds to a prefix in a bank card account number, and a second account field corresponds to a postfix in the bank card account. For example, if a bank card account number of a deposit card issued by a branch of XX bank at Y region is 1111 2323 6232 3888, "1111 2323 6232" is the first account field, and "3888" is the second account field.

Information input methods in some embodiments are described with reference to FIG. 1 and FIG. 2.

FIG. 1 is a flowchart of an information input method in accordance with some embodiments. The method shown in FIG. 1 comprises step S101 to step S103, which are described below.

At S101, when account information is entered, a user terminal outputs at least one piece of account pre-selection information, and acquires the first account field that is entered according to the at least one piece of account pre-selection information.

In some embodiments, when it is necessary to record an account number, the user terminal outputs the at least one piece of account pre-selection information to prompt a user to enter a first account field according to the prompt of the at least one piece of account pre-selection information, and also prompts the user to make a selection directly in the at least one piece of account pre-selection information, such that the user may directly click for selection in the at least one piece of account pre-selection information, and the user terminal acquires the first account field that is entered according to the at least one piece of account pre-selection information.

In some embodiments, when the user makes a selection in the at least one piece of account pre-selection information, and it is necessary to narrow the selection range, the user enters a key field (e.g., enter the first digit of the account held by the user), and the user terminal filters the account pre-selection information beginning with the key field from the at least one piece of account pre-selection information, or filter the account pre-selection information containing the key field, thereby narrowing the selection range of the account pre-selection information to improve the accuracy of account prompt.

In some embodiments, the user terminal outputs and displays the first account field after acquiring the first account field. If the displayed first account field is wrong, the user may manually modify the first account field.

At S102, the user terminal acquires an entered second account field.

In some embodiments, after the first account field is selected and entered, the user manually enters the second account field, and the user terminal acquires the entered second account field.

At S103, the user terminal generates the account using the second account field and the entered first account field.

In some embodiments, after the user terminal acquires the first account field and the second account field, the user terminal generates the account using the first account field and the second account field. In some embodiments, the user terminal generates the account when the user sends a confirmation instruction. The user may click a confirmation button displayed in the display screen of the user terminal after entering the second account field, to send the confirmation instruction to the user terminal.

In some embodiments, when an account is entered, the account is generated by outputting account pre-selection information and acquiring an entered second account field and a first account field entered according to the account pre-selection information. The first account field can be input just by providing account pre-selection information, thus simplifying the account input process. The account pre-selection information can be filtered according to a key field entered by the user to narrow the selection range, thus improving the accuracy of account prompt and improving the convenience of information input to further improve the efficiency of daily transactions.

Figure 2:
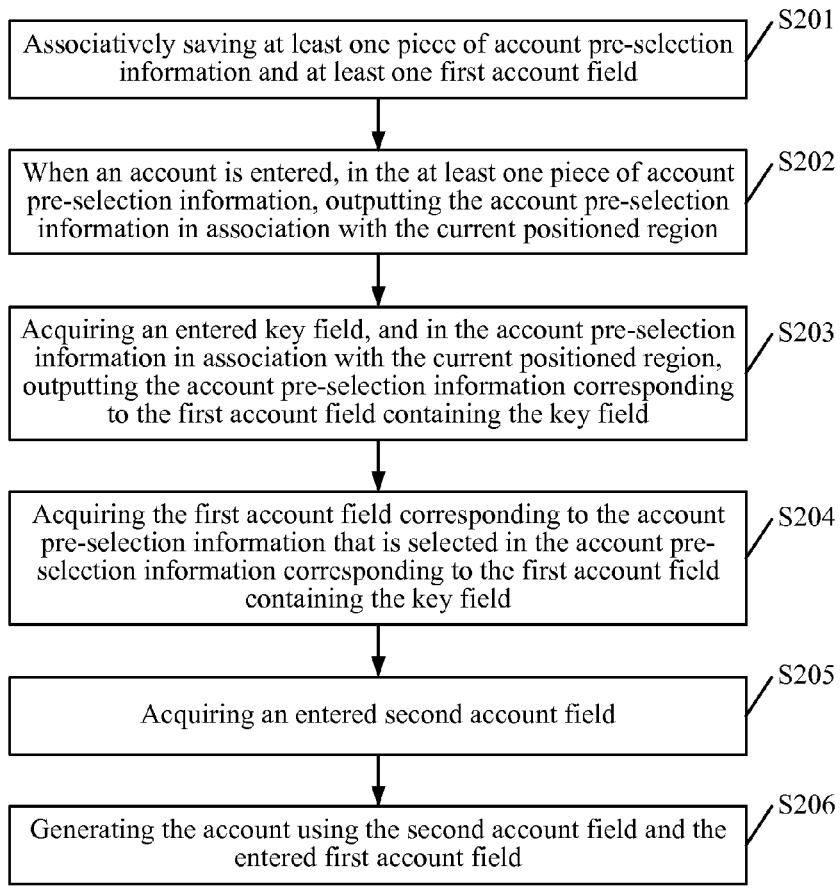
FIG. 2 is a flowchart of another information input method in accordance with some embodiments.

FIG. 2 is a flowchart of another information input method in accordance with some embodiments. The method shown in FIG. 2 comprises step S201 to step S206, which are described below.

At S201, a user terminal associatively saves at least one piece of account pre-selection information and at least one first account field.

In some embodiments, the user terminal associatively saves at least one piece of account pre-selection information and at least one first account field in advance. One piece of account pre-selection information corresponds to one first account field.

In some embodiments, each piece of account pre-selection information in the at least one piece of account pre-selection information is specifically an account opening geographical location. In some embodiments, the account opening geographical location is a specific location of a branch of an account management mechanism that issues the account (e.g., a branch of AA shop in D region). Different account opening geographical locations correspond to different first account fields (e.g., the first account field of an account belonging to the shop AA in region D is 2323, and the first account field of an account belong to the same shop AA in region E is 2324, etc.). The user terminal associatively saves the account opening geographical location and the first account field corresponding to each account opening geographical location.

At S202, when an account is entered in the at least one piece of account pre-selection information, the user terminal outputs the account pre-selection information in association with the current positioned region.

In some embodiments, when it is necessary to record an account, the user terminal outputs the at least one piece of account pre-selection information. In some embodiments, in the at least one account opening geographical location, the user terminal outputs the account opening geographical location that belongs to the current positioned region. The current positioned region may be the current region that is determined by a global positioning system (GPS) tool in the user terminal (e.g., if the current positioned region is Shenzhen, the user terminal may output the first account field corresponding to these account opening geographical locations such as Nanshan District, Futian District or Luohu District). In some embodiments, in order to make it convenient to display, the user terminal outputs and displays the account opening geographical locations of the current positioned region, and other account opening geographical locations are placed in a same selection label. In some embodiments, if the account opening geographical location that the user needs to select is not in the account opening geographical locations of the current positioned region, the user clicks the selection label to search the account opening geographical location that is needed to select.

At S203, the user terminal acquires an entered key field, and in the account pre-selection information in association with the current positioned region, outputs the account pre-selection information corresponding to the first account field containing the key field.

Optionally, in order to reduce the time for searching an account opening geographical location, the user may in advance enter a key field that is the first character or the first few characters in the first account field corresponding to the account opening geographical location to which this account belongs. The user terminal acquires the entered key field, and in the first account field corresponding to the account opening geographical location that belongs to the current positioned region, outputs the account opening geographical location corresponding to the first account field containing the second key field, to allow the user to make a further selection.

At S204, the user terminal acquires the first account field corresponding to the account pre-selection information that is selected in the account pre-selection information corresponding to the first account field containing the key field.

In some embodiments, after the user makes a selection, the user terminal acquires the first account field corresponding to the account pre-selection information that is selected in the account pre-selection information in association with the current positioned region. In some other embodiments, the user terminal acquires the first account field corresponding to the account pre-selection information that is selected in the account pre-selection information corresponding to the first account field containing the key field.

At S205, the user terminal acquires an entered second account field.

At S206, the user terminal generates the account using the second account field and the entered first account field.

Operations at S205 and S206 correspond to operations described with respect to S102 and S103 shown in FIG. 1. For brevity, these details are not repeated herein.

In some embodiments, when an account is entered, the account is generated by outputting account pre-selection information and acquiring an entered second account field and a first account field entered according to the account pre-selection information. The account pre-selection information is preset to provide prompt information for the user when the user enters an account. Data such as the current positioned region is used to assist the output and the display of the account pre-selection information, thereby improving the accuracy of the prompt information. The input of the first account field can be accomplished just by providing account pre-selection information, thereby simplifying the account input process. The account pre-selection information can be filtered according to a key field entered by the user to narrow the selection range, thereby improving the accuracy of account prompt and improving the convenience of information input to further improve the efficiency of daily transactions.

Information input methods in accordance with some embodiments are described with reference to FIG. 3 and FIG. 4.

Figure 3:
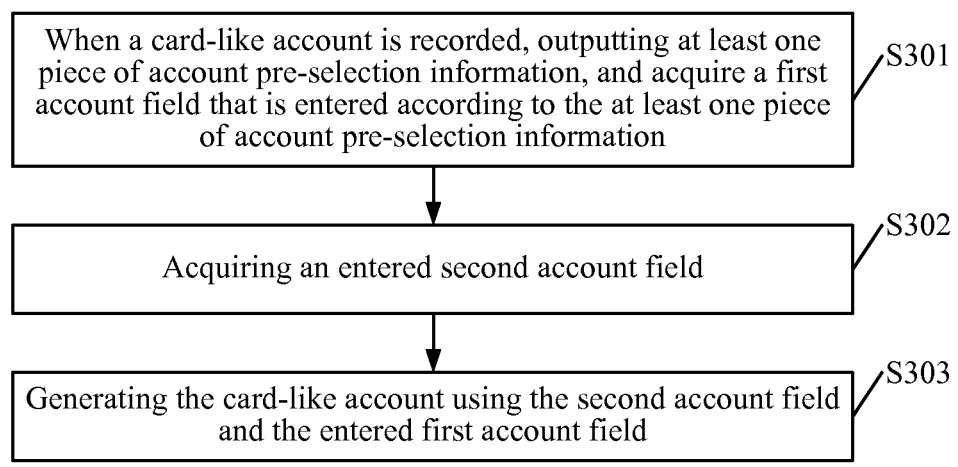
FIG. 3 is a flowchart of an account information input method in accordance with some embodiments.

FIG. 3 is a flowchart of an account information input method in accordance with some embodiments. The method shown in FIG. 3 comprises step S301 to step S303, which are described below.

At S301, when an account number (e.g., a credit card number or a membership number) is recorded, the account generation terminal outputs at least one piece of account pre-selection information, and acquires the first account field that is entered according to the at least one piece of account pre-selection information.

In some embodiments, when the account number is recorded, an account generation terminal outputs at least one piece of account pre-selection information to prompt a user to enter a first account field according to the prompt of the at least one piece of account pre-selection information, and also prompts the user to make a selection directly in the at least one piece of account pre-selection information, such that the user may directly click for selection in the at least one piece of account pre-selection information, and the account generation terminal acquires the first account field that is entered according to the at least one piece of account pre-selection information.

Each piece of account pre-selection information in the at least one piece of account pre-selection information comprises the name of the account management mechanism, the account opening geographical location and the account type. The name of the account management mechanism may be specifically the name of the management mechanism that issues the account number (e.g., a bank, etc.). The account opening geographical location may be specifically the specific location of a branch of the account management mechanism that issues the account number (e.g., a branch of AA bank at D region). The account type may be specifically the type of a carrier of the account number (e.g., a deposit card, a platinum card, an international bank, etc.).

When it is necessary to record an account number, the account generation terminal outputs the name of at least one account management mechanism, acquires a name number corresponding to the name of the account management mechanism that is selected in the name of the at least one account management mechanism. When the account generation terminal acquires the name number corresponding to the name of the selected account management mechanism, the account generation terminal outputs the at least one account opening geographical location associated under the name of the selected account management mechanism, and acquires the location number corresponding to the account opening geographical location that is selected in the at least one account opening geographical location. When the account generation terminal selects the location number corresponding to the account opening geographical location, the account generation terminal outputs the at least one account type associated under the selected account opening geographical location, and acquires the type number corresponding to the account type that is selected in the at least one account type, and the account generation terminal enters the first account field according to the name number, the location number and the type number.

In some embodiments, when the user makes a selection in the at least one piece of account pre-selection information, if it is necessary to narrow the selection range, the user enters a key field, e.g., enter the first digit of the account number held by the user, and the account generation terminal filters the account pre-selection information beginning with the key field from the at least one piece of account pre-selection information, or filters the account pre-selection information containing the key field, thereby narrowing the selection range of the account pre-selection information to improve the accuracy of account prompt.

In some embodiments, the account generation terminal outputs and displays the first account field after acquiring the first account field. If the displayed first account field is wrong, the user may manually modify the first account field.

At S302, the account generation terminal acquires an entered second account field.

In some embodiments, after the first account field is selected and entered, the user manually enters a second account field, and the account generation terminal acquires the entered second account field.

At S303, the account generation terminal generates an account number using the second account field and the entered first account field.

In some embodiments, after the account generation terminal acquires the first account field and the second account field, the account generation terminal generates the account number using the first account field and the second account field. In some embodiments, the account generation terminal generates the account number when the user sends a confirmation instruction. The user may click a confirmation button displayed in the display screen of the account generation terminal after entering the second account field to send a confirmation instruction to the account generation terminal.

In some embodiments, when it is necessary to make a subsequent payment (e.g., make an online or offline payment for tangible goods, such as a chair, mineral water, etc., or intangible goods, such as telephone bill, web payment currency, etc.), the account generation terminal sends, to a transaction system of the account management mechanism to which the account number belongs, a payment request that carries order information, individual information and the account number. In some embodiments, the individual information includes an individual name, a phone number, a payment password, etc., which enables the transaction system to carry out identity authentication on the individual information and the account number to determine whether the user identity matches the holder of the account number, and determine whether the holder of the account number has rights to pay. The transaction system carries out payment processing on the order information after the authentication succeeds.

In some embodiments, when an account number is recorded, the account number is generated by outputting account pre-selection information and acquiring an entered second account field and a first account field that is entered according to the account pre-selection information. In some embodiments, the first account field is entered by providing account pre-selection information, thereby simplifying the account number input process. In some embodiments, the account pre-selection information is filtered according to a key field entered by the user to narrow the selection range, thereby improving the accuracy of account prompt and improving the convenience of information input.

Figure 4:
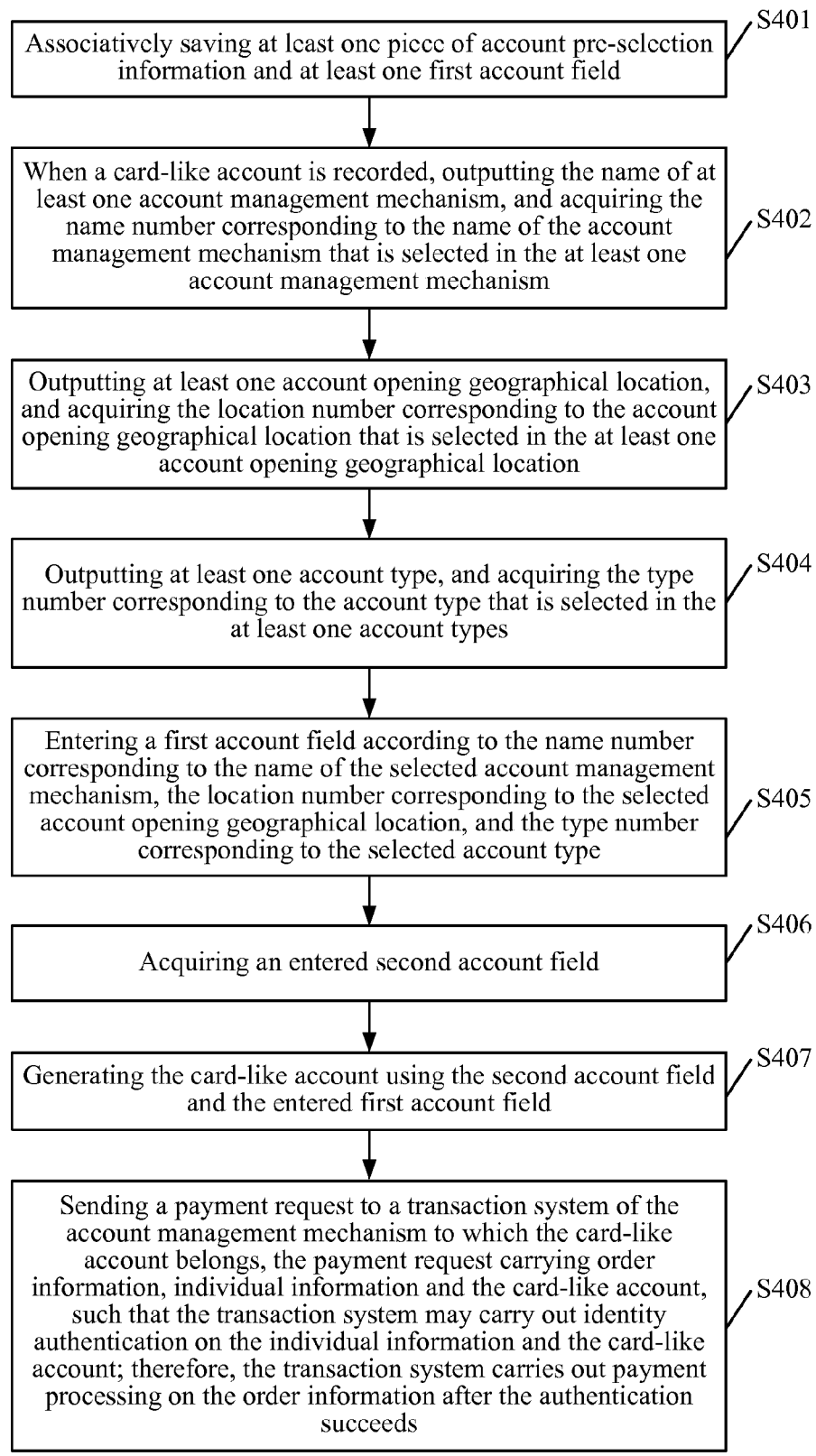
FIG. 4 is a flowchart of another account information input method in accordance with some embodiments.

FIG. 4 is a flowchart of another account information input method in accordance with some embodiments. The method shown in FIG. 4 comprises step S401 to step S408, which are described below.

At S401, the account generation terminal associatively saves at least one piece of account pre-selection information and at least one first account field.

In some embodiments, the account generation terminal associatively saves at least one piece of account pre-selection information and at least one first account field in advance. One piece of account pre-selection information corresponds to one first account field.

In some embodiments, each piece of account pre-selection information in the at least one piece of account pre-selection information comprises the name of the account management mechanism, the account opening geographical location and the account type. In some embodiments, the name of the account management mechanism is the name of the management mechanism that issues the account number (e.g., a bank, etc.). In some embodiments, the account opening geographical location is the specific location of a branch of the account management mechanism that issues the account number (e.g., a branch of AA bank at D region). In some embodiments, the account type is specifically the type of a carrier of the account number (e.g., a deposit card, a platinum card, an international bank, etc.). In some embodiments, the names of different account management mechanisms correspond to different name numbers (e.g., the name number corresponding to AA bank is 1111, the name number corresponding to BB bank is 1222, etc.). In case that the names of the account management mechanisms are the same, different account opening geographical locations correspond to different location numbers (e.g., for accounts commonly belonging to AA bank, the location number in D region is 2323, the location number in E region is 2324, etc.). However, in case that the names of the account management mechanisms are the same and the account opening geographical locations are the same, different account types also correspond to different type numbers (e.g., for accounts commonly belonging to AA bank's D region, the type number corresponding to a deposit card is 6232, the type number corresponding to a platinum card is 7232, etc.).

The account generation terminal associatively saves the names of the account management mechanisms and the name numbers corresponding to the names of the account management mechanisms. Under the name of the account management mechanism, the account generation terminal associatively saves the account opening geographical locations and the location numbers corresponding to the account opening geographical locations. Under the name of the account management mechanism and the account opening geographical location, the account generation terminal associatively saves the account types and the type numbers corresponding to the account types.

At S402, when an account number is recorded, the account generation terminal outputs the name of at least one account management mechanism, and acquires the name number corresponding to the name of the account management mechanism that is selected in the name of the at least one account management mechanism.

In some embodiments, when it is necessary to record an account number, the account generation terminal first outputs the name of at least one account management mechanism. It may be understood that, in order to make it convenient to display, the account generation terminal may count the number of users of each account management mechanism, output and display the first several account management mechanism names ordered by the number of users, and the other account management mechanism names may be placed in a same selection label. If the name of the account management mechanism that the user needs to select is not in the several account management mechanism names with the number of users at top, the user may click the selection label to search the desired account management mechanism name. For example, please refer to FIG. 4A, which is a schematic diagram illustrating operations of an account input method in accordance with some embodiments. As shown in FIG. 4A, when it is necessary to record a bank card account, the account generation terminal displays a payment account input box and an account pre-selection information box. The payment account input box provides an interface via which the user enters the bank card account, and the account pre-selection information box is used for user selection. In case that AA bank, BB bank and CC bank are the top three banks ordered by the number of users counted in advance, and the name numbers corresponding to AA bank, BB bank and CC bank are 1111, 1222 and 1333 respectively, if the user cannot find the name of the bank to which his bank card account belongs, the user may click a selection label "More", such that the account generation terminal may list the names of all banks in detail to allow the user to click for selection.

In some embodiments, in order to reduce the time for searching the name of an account management mechanism, the user enters a first key field in advance. The first key field may be the first character or the first few characters in the name number corresponding to the name of the account management mechanism to which the account number belongs. The account generation terminal acquires the entered first key field, and in the name number corresponding to the name of the at least one account management mechanism, outputs the name of the account management mechanism corresponding to the name number containing the first key field, to allow the user to make a further selection. After the user makes a selection, the account generation terminal acquires the name number corresponding to the name of the account management mechanism that is selected in the names of the account management mechanisms corresponding to the name numbers containing the first key field. For example, please refer to FIG. 4B, which is a schematic diagram illustrating operations of an account input method in accordance with some embodiments. As shown in FIG. 4B, given that the first digit of the name number of the bank to which the bank card account of the user belongs is "1", the user may first enter a first key field "1" in the payment account input box, and the account generation terminal automatically filters a bank name containing "1" out of the name numbers corresponding to the at least one bank and the name number corresponding to the bank name, and outputs and displays the bank name containing "1" and the name number corresponding to the bank name. Preferably, when displaying, the account generation terminal may highlight the "1" in the filtered name numbers, to allow the user to click for selection. It should be noted that, if there are many account management mechanism names corresponding to the name numbers containing the first key field, the account generation terminal can also performing ranking processing on the names of the account management mechanisms corresponding to the name numbers containing the first key field according to the number of users of the account management mechanism, and output the ranked account management mechanism names corresponding to the name numbers containing the first key field.

The account generation terminal acquires the name number corresponding to the name of the account management mechanism that is selected by the user.

At S403, the account generation terminal outputs at least one account opening geographical location, and acquires the location number corresponding to the account opening geographical location that is selected in the at least one account opening geographical location.

Specifically, the account generation terminal further outputs the at least one account opening geographical location associated under the name of the selected account management mechanism according to the name of the selected account management mechanism. Preferably, the account generation terminal outputs the account opening geographical location that belongs to the current positioned region in the at least one account opening geographical location associated under the name of the selected account management mechanism. The current positioned region may be the current region that is positioned by a GPS tool in the account generation terminal, e.g., if the current positioned region is Shenzhen, the account generation terminal may output the location number corresponding to these account opening geographical locations such as Nanshan District, Futian District, Luohu District. It may be understood that, in order to make it convenient to display, the account generation terminal may output and display the account opening geographical location of the current positioned region, and other account opening geographical locations may be placed in a same selection label. If the account opening geographical location that the user needs to select is not in the account opening geographical location of the current positioned region, the user may click the selection label to search the account opening geographical location that is needed to select. For example, please refer to FIG. 4C, which is a schematic diagram illustrating operations of an account input method in accordance with some embodiments. As shown in FIG. 4C, if the name of the account management mechanism selected by the user is AA bank, the name number "1111" corresponding to AA bank will be shown in the payment account input box. At this moment, the account opening geographical location acquired by current positioning may be output in the account pre-selection information, and the account generation terminal may perform ranking by the distances of these account opening geographical location away from the current location of the user, preferentially output D region, E region and F region which are three nearest account opening geographical locations, with the location numbers corresponding to D region, E region and F region being 2323, 2324 and 2325, respectively. If the user cannot find the account opening geographical location to which his bank card account belongs from the first three account opening geographical locations, the user may click the selection label "More", such that the account generation terminal may list the names of all account opening geographical locations in detail to allow the user to click for selection.

Alternatively, in order to reduce the time for searching the account opening geographical location, the user may enter a second key field in advance. The second key field may be the first character or the first N characters in the location number corresponding to the account opening geographical location to which the account number of the user belongs. The account generation terminal acquires the entered second key field, and in the location numbers corresponding to the account opening geographical locations that belong to the current positioned region, outputs the account opening geographical location corresponding to the location number containing the second key field, to allow the user to make a further selection. After the user makes a selection, the account generation terminal acquires the location number corresponding to the account opening geographical location that is selected in the account opening geographical locations corresponding to the location numbers containing the second key field. For example, please refer to FIG. 4D, which is a schematic diagram illustrating operations of an account input method in accordance with some embodiments. As shown in FIG. 4D, given that the first digit of the location number of the account opening geographical location to which the bank card account of the user belongs is "2", the user may first enter a second key field "2" in the payment account input box, and the account generation terminal automatically filters an account opening geographical locations containing "2" in the location numbers corresponding to the at least one account opening geographical location as well as the location number corresponding to the account opening geographical location, and outputs and displays the account opening geographical locations containing "2" and the location numbers corresponding to the account opening geographical locations. Preferably, when displaying, the account generation terminal may highlight the "2" in the filtered location numbers to allow the user to click for selection. It should be noted that, if there are many account opening geographical locations corresponding to the location numbers containing the second key field, the account generation terminal can also carry out ranking processing on the filtered location number by the distances of the account opening geographical locations away from the current location of the user, and output the ranked account opening geographical locations corresponding to the location numbers containing the second key field.

The account generation terminal acquires the location number corresponding to the account opening geographical location selected by the user.

At S404, the account generation terminal outputs at least one account type, and acquires the type number corresponding to the account type that is selected in the at least one account type.

Specifically, the account generation terminal further outputs the at least one account type associated under the selected account opening geographical location according to the name of the selected account management mechanism and the selected account opening geographical location. It may be understood that, in order to make it convenient to display, the account generation terminal may preferentially display several account types, and place the other account types in a same selection label. If the account type that the user needs to select is not in the preferentially displayed several account types, the user may click the selection label to search the desired account type. For example, please refer to FIG. 4E, which is a schematic diagram illustrating operations of an account input method in accordance with some embodiments. As shown in FIG. 4E, if the name of the account management mechanism selected by the user is AA bank, and the selected account opening geographical location is D region, the name number corresponding to AA bank and the location number "1111 2323" corresponding to D region will be displayed in the payment account input box. At this moment, the account pre-selection information may output account types of a deposit card, a platinum card and an international bank successively, and the type numbers corresponding to the deposit card, the platinum card and the international bank are 6232, 7232 and 9542 respectively. If the user cannot find the account type of his bank card account in the first three account types, the user may click a selection label "More", such that the account generation terminal may list all account types in detail to allow the user to click for selection.

Alternatively, in order to reduce the time for searching the account type, the user may enter a third key field in advance. The third key field may be the first character or the first N characters in the type number corresponding to the account type to which the account number of the user belongs, the account generation terminal acquires the entered third key field, and outputs the account type corresponding to the type number containing the third key field in the type numbers corresponding to the at least one account type to allow the user to make a further selection. After the user makes a selection, the account generation terminal acquires the type number corresponding to the account type that is selected in the account types corresponding to the type numbers containing the third key field. For example, please refer to FIG. 4F, which is a schematic diagram illustrating operations of an account input method in accordance with some embodiments. As shown in FIG. 4F, given that the first digit of the account type to which the bank card account of the user belongs is "6", the user may first enter a first key field "6" in the payment account input box, and the account generation terminal automatically filters an account type containing "6" in the type numbers corresponding to the at least one account type and the type number corresponding to the account type, and outputs and displays the account type containing "6" and the type number corresponding to the account type. Preferably, when displaying, the account generation terminal may highlight the "6" in the filtered type numbers to allow the user to click for selection.

The account generation terminal acquires the type number corresponding to the account type selected by the user.

At S405, the account generation terminal enters the first account field according to the name number corresponding to the name of the selected account management mechanism, the location number corresponding to the selected account opening geographical location, and the type number corresponding to the selected account type.

Specifically, the account generation terminal generates the entered first account field according to the acquired name number, the location number and the type number. For example, please refer to FIG. 4G, which is a schematic diagram illustrating operations of an account input method in accordance with some embodiments. As shown in FIG. 4G, after the user makes a selection, if the name of the account management mechanism selected by the user is AA bank, the selected account opening geographical location is D region, and the selected account type is deposit card, it will generate, in the payment account input box, the name number corresponding to the entered AA bank, the location number corresponding to D region and the type number "1111 2323 6232" corresponding to a deposit card. At this moment, the account generation terminal may hide the account pre-selection information box, and prompt the user to output the second account field.

At S406, the account generation terminal acquires an entered second account field.

Specifically, after the first account field is selected and entered, the user may manually enter a second account field, and the account generation terminal acquires the entered second account field.

At S407, the account generation terminal generates the account number using the second account field and the entered first account field.

Specifically, after the account generation terminal acquires the first account field and the second account field, the account generation terminal may generate the account number using the first account field and the second account field. For example, please refer to FIG. 4H, which is a schematic diagram illustrating operations of an account input method in accordance with some embodiments. As shown in FIG. 4H, if the first account field acquired by the account generation terminal is "1111 2323 6232", and the second account field acquired by the account generation terminal is "3888", the account generation terminal generates a bank card account "1111 2323 6232 3888" using the acquired first account field and the second account field.

Preferably, the account generation terminal may generate the account number when the user sends a confirmation instruction, and the user may click a confirmation button displayed in the display screen of the account generation terminal after entering the second account field, to send the confirmation instruction to the account generation terminal.

At S408, the account generation terminal sends a payment request to a transaction system of the account management mechanism to which the account number belongs, the payment request carrying order information, individual information and the account number, such that the transaction system may carry out identity authentication on the individual information and the account number; therefore, the transaction system carries out payment processing on the order information after the authentication succeeds.

Specifically, when it needs to make subsequent payments, e.g., make a payment for a target to be paid, or online payment for offline shopping, etc., the target may be tangible goods (e.g., a chair, mineral water, etc.), and may also be intangible goods (e.g., telephone bill, web payment currency, etc.), and the account generation terminal may send, to a transaction system of the account management mechanism to which the account number belongs, a payment request that carries order information, individual information and the account number, the individual information comprising an individual name, a phone number, a payment password, etc., such that the transaction system may carry out identity authentication on the individual information and the account number to determine whether the user identity is the holder of the account number, and determine whether the account number has payment rights. The transaction system carries out payment processing on the order information after the authentication succeeds.

In some embodiments, when a card-like account is recorded, the account number is generated by outputting account pre-selection information and acquiring an entered second account field and a first account field that is entered according to the account pre-selection information. Presetting account pre-selection information may provide prompt information for the user when a card-like account is entered; data such as the number of users and the current positioned region is used to assist the output and display of the account pre-selection information, which improves the accuracy of prompt information; the input of the first account field can be accomplished just by providing account pre-selection information, which simplifies the account number input process; and the account pre-selection information can be filtered according to a key field entered by the user to narrow the selection range, thereby improving the accuracy of account prompt and improving the convenience of information input.

Figure 5:
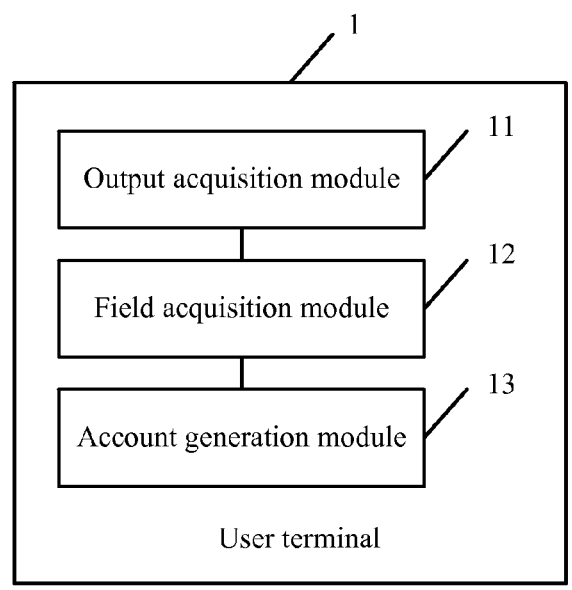
FIG. 5 is a schematic diagram illustrating a structure of a user terminal in accordance with some embodiments.
Figure 6:
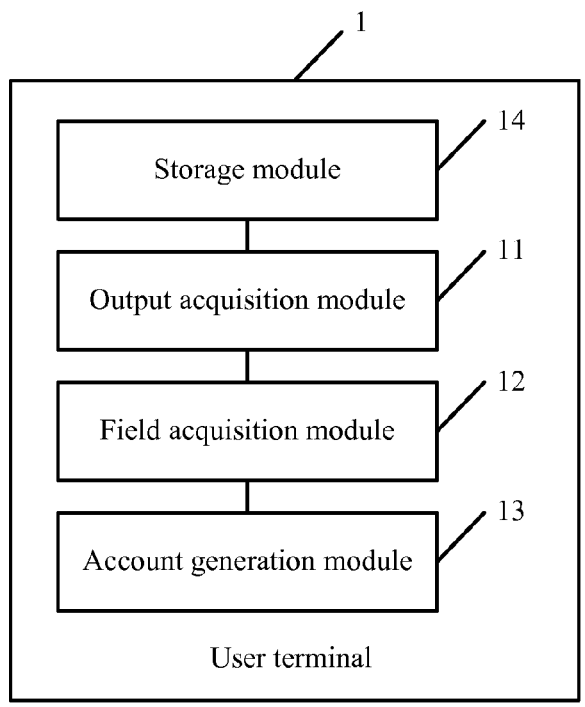
FIG. 6 is a schematic diagram illustrating a structure of another user terminal in accordance with some embodiments.
Figure 7:
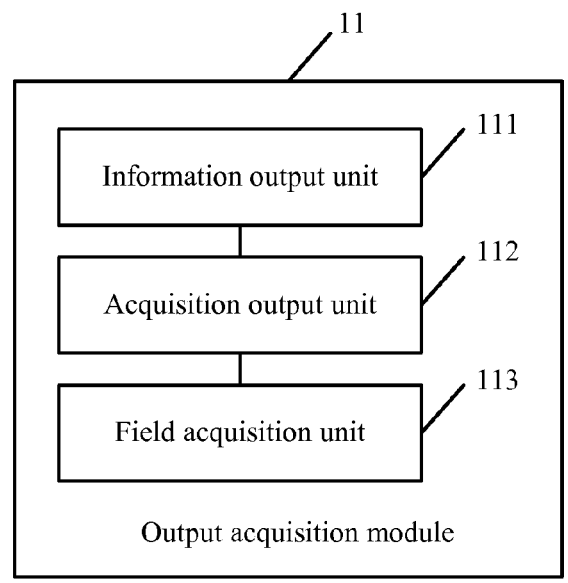
FIG. 7 is a schematic diagram illustrating a structure of an output acquisition module in accordance with some embodiments.

The user terminal provided in some embodiments will be described in detail with reference to FIG. 5 to FIG. 7. It should be noted that, the user terminal shown in FIG. 5 to FIG. 7 is used to execute one or more methods illustrated in FIG. 1 and FIG. 2. In order to make it convenient to illustrate, only portions related to understanding particular embodiments are illustrated, and the undisclosed specific details can be made reference to the embodiments shown in FIG. 1 and FIG. 2.

FIG. 5 is a schematic diagram illustrating a structure of a user terminal in accordance with some embodiments. The user terminal 1 shown in FIG. 5 comprises an output acquisition module 11, a field acquisition module 12 and an account generation module 13.

The output acquisition module 11 is used to output at least one piece of account pre-selection information during account input, and acquire the first account field that is entered according to the at least one piece of account pre-selection information.

During specific implementation, when it needs to record an account, the output acquisition module 11 may output at least one piece of account pre-selection information, to prompt a user to enter a first account field according to the prompt of the at least one piece of account pre-selection information, and also prompt the user to make a selection directly in the at least one piece of account pre-selection information, such that the user may directly click for selection in the at least one piece of account pre-selection information, and the output acquisition module 11 acquires the first account field that is entered according to the at least one piece of account pre-selection information.

When the user makes a selection in the at least one piece of account pre-selection information, if it needs to narrow the selection range, the user may enter a key field, e.g., enter the first digit of the account held by the user, the output acquisition module 11 may filter the account pre-selection information beginning with the key field from the at least one piece of account pre-selection information, or filter the account pre-selection information containing the key field, thereby narrowing the selection range of account pre-selection information to improve the accuracy of account prompt.

It should be noted that, the output acquisition module 11 may output and display the first account field after acquiring the first account field, and if the displayed first account field is wrong, the user may manually modify the first account field.

The field acquisition module 12 is used to acquire an entered second account field.

During specific implementation, after the first account field is selected and entered, the user may manually enter a second account field, and the field acquisition module 12 acquires the entered second account field.

The account generation module 13 is used to generate the account using the second account field and the entered first account field.

During specific implementation, after the account generation module 13 acquires the first account field and the second account field, the account generation module 13 may generate the account using the first account field and the second account field, preferably, the account generation module 13 may generate the account when the user sends a confirmation instruction, and the user may click a confirmation button displayed in the display screen of the user terminal 1 after entering the second account field to send the confirmation instruction to the user terminal 1.

In some embodiments, when an account is entered, the account is generated by outputting account pre-selection information and acquiring an entered second account field and a first account field entered according to the account pre-selection information. The first account field can be input just by providing account pre-selection information, thus simplifying the account input process. The account pre-selection information can be filtered according to a key field entered by the user to narrow the selection range, thus improving the accuracy of account prompt and improving the convenience of information input to further improve the efficiency of daily transactions.

FIG. 6 is a schematic diagram illustrating a structure of another user terminal in accordance with some embodiments. The user terminal 1 shown in FIG. 6 comprises: an output acquisition module 11, a field acquisition module 12, an account generation module 13 and a storage module 14. The structures of the field acquisition module 12 and the account generation module 13 can be made reference to the specific description of the embodiment shown in FIG. 5, which is unnecessary to describe here in details.

The storage module 14 is used to associatively save at least one piece of account pre-selection information and at least one first account field.

During specific implementation, the storage module 14 may associatively save at least one piece of account pre-selection information and at least one first account field in advance, wherein one piece of account pre-selection information corresponds to one first account field.

It should be noted that, each piece of account pre-selection information in the at least one piece of account pre-selection information may be specifically an account opening geographical location that may be specifically the specific location of a branch of the account management mechanism which issues the account (e.g., a branch of shop AA in region D), different account opening geographical locations correspond to different first account fields, e.g., commonly belonging to the same shop AA, the first account field in region D is 2323, the first account field in region E is 2324, etc., and the storage module 14 associatively save an account opening geographical location and the first account field corresponding to each account opening geographical location.

The output acquisition module 11 is used to output at least one piece of account pre-selection information during account input, and acquire the first account field that is entered according to the at least one piece of account pre-selection information.

During specific implementation, when it needs to record an account, the output acquisition module 11 may output at least one piece of account pre-selection information, to prompt a user to enter a first account field according to the prompt of the at least one piece of account pre-selection information, and also prompt the user to make a selection directly in the at least one piece of account pre-selection information, such that the user may directly click for selection in the at least one piece of account pre-selection information, and the output acquisition module 11 acquires the first account field that is entered according to the at least one piece of account pre-selection information.

When the user makes a selection in the at least one piece of account pre-selection information, if it needs to narrow the selection range, the user may enter a key field, e.g., enter the first digit of the account held by the user, the output acquisition module 11 may filter the account pre-selection information beginning with the key field from the at least one piece of account pre-selection information, or filter the account pre-selection information containing the key field, thereby narrowing the selection range of account pre-selection information to improve the accuracy of account prompt.

It should be noted that, the output acquisition module 11 may output and display the first account field after acquiring the first account field, and if the displayed first account field is wrong, the user may manually modify the first account field.

FIG. 7 is a schematic diagram illustrating a structure of an output acquisition module in accordance with some embodiments. The output acquisition module 11 shown in FIG. 7 comprises: an information output unit 111 which is used to output the account pre-selection information in association with the current positioned region in the at least one piece of account pre-selection information.

During specific implementation, when it needs to record an account, the information output unit 111 outputs the at least one piece of account pre-selection information. Preferably, the information output unit 111 outputs the account opening geographical location that belongs to the current positioned region in the at least one account opening geographical location. The current positioned region may be the current region that is positioned by a GPS tool in the information output unit 111, e.g., if the current positioned region is Shenzhen, the information output unit 111 may output the first account field corresponding to these account opening geographical locations such as Nanshan District, Futian District, Luohu District. It may be understood that, in order to make it convenient to display, the information output unit 111 may output and display the account opening geographical location of the current positioned region, and other account opening geographical locations may be placed in a same selection label. If the account opening geographical location that the user needs to select is not in the account opening geographical location of the current positioned region, the user may click the selection label to search the account opening geographical location that is needed to select.

An acquisition output unit 112 which is used to acquire an entered key field, and in the account pre-selection information in association with the current positioned region, output the account pre-selection information corresponding to the first account field containing the key field.

During specific implementation, of course, optionally, in order to reduce the time for searching the account opening geographical location, the user may in advance enter a key field that may be the first character or the first N characters in the first account field corresponding to the account opening geographical location that this account belongs, and the acquisition output unit 112 acquires the entered key field, and outputs the account opening geographical location corresponding to the first account field containing the second key field in the first account field corresponding to the account opening geographical location that belongs to the current positioned region, so as to allow the user to make a further selection.

The field acquisition unit 113 is used to acquire the first account field corresponding to the account pre-selection information that is selected in the account pre-selection information corresponding to the first account field containing the key field.

During specific implementation, after the user makes a selection, the field acquisition unit 113 acquires the first account field corresponding to the account pre-selection information that is selected in the account pre-selection information in association with the current positioned region, alternatively, the field acquisition unit 113 acquires the first account field corresponding to the account pre-selection information that is selected in the account pre-selection information corresponding to the first account field containing the key field.

In some embodiments, when an account is entered, the account is generated by outputting account pre-selection information and acquiring an entered second account field and a first account field entered according to the account pre-selection information. Presetting account pre-selection information may provide prompt information for the user when the user enters an account. Data such as the current positioned region is used to assist the output and the display of the account pre-selection information, thereby improving the accuracy of the prompt information. The input of the first account field can be accomplished just by providing account pre-selection information, thereby simplifying the account input process. The account pre-selection information can be filtered according to a key field entered by the user to narrow the selection range, thereby improving the accuracy of account prompt and improving the convenience of information input to further improve the efficiency of daily transactions.

Figure 8:
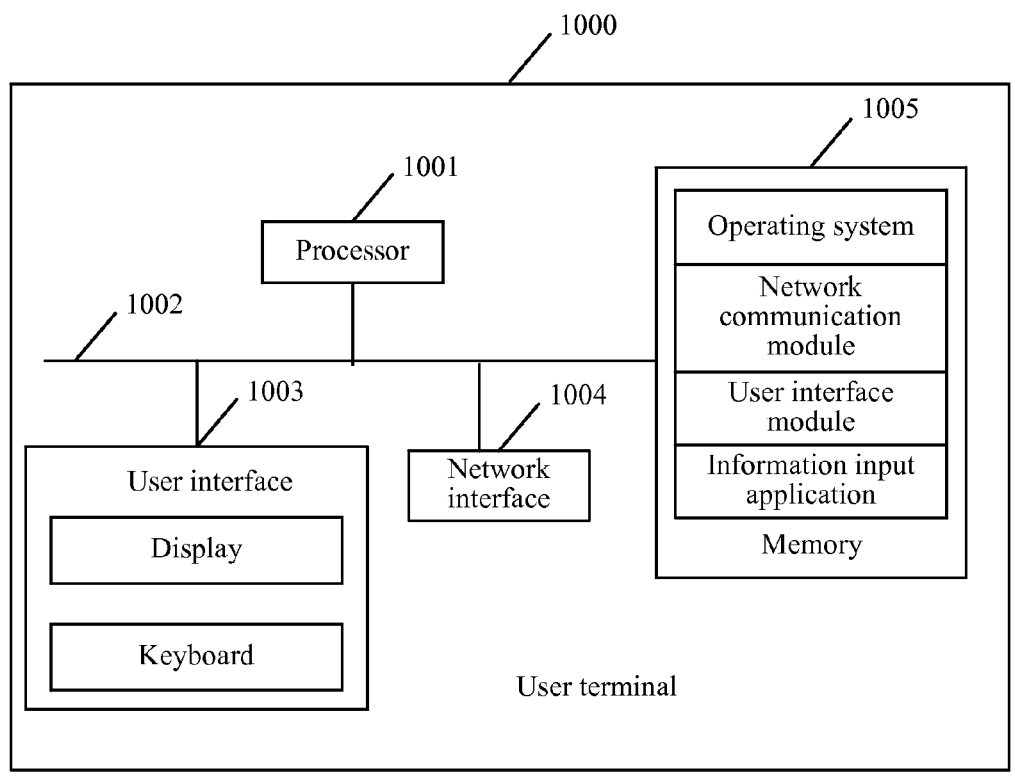
FIG. 8 is a schematic diagram illustrating a structure of still another user terminal in accordance with some embodiments.

FIG. 8 is a schematic diagram illustrating a structure of still another user terminal in accordance with some embodiments. The user terminal 1000 shown in FIG. 8 comprises: at least one processor 1001, e.g., a CPU, at least one network interface 1004, a user interface 1003, a memory 1005, and at least one communication bus 1002. The communication bus 1002 is used to implement connection and communication among these elements. The user interface 1003 may comprise a display and a keyboard, and optionally the user interface 1003 may also comprise standard wired interfaces and wireless interfaces. Optionally, the network interface 1004 may comprise standard wired interfaces and wireless interfaces (such as a Wi-Fi interface). The memory 1005 may be a high speed random access memory, or may be a non-volatile memory, e.g., at least one magnetic disk memory. Optionally, the memory 1005 may also be at least one storage device located away from the above-mentioned processor 1001. As shown in FIG. 8, the memory 1005, for being used as a computer storage medium, may comprise an operating system, a network communication module, a user interface module and an information input application.

In the user terminal 1000 shown in FIG. 8, the network interface 1004 is mainly used to be connected with the system of the account management mechanism to which the account number belongs to carry out data communication with the system of the account management mechanism; and the user interface 1003 is mainly used to provide an input interface for the user and acquire the data output by the user; and the processor 1001 can be used to call the information input application stored in the memory 1005, and specifically execute the following steps: when an account is entered, outputting at least one piece of account pre-selection information, and acquiring a first account field that is entered according to the at least one piece of account pre-selection information; acquiring an entered second account field; and generating the account using the second account field and the entered first account field.

In one embodiment, before performing account input, the processor 1001 also executes the following step: associatively saving at least one piece of account pre-selection information and at least one first account field, wherein one piece of account pre-selection information corresponding to one first account field.

In one embodiment, when the processor 1001 executes the output of the at least one piece of account pre-selection information, it specifically executes the following step: outputting the account pre-selection information in association with the current positioned region in the at least one piece of account pre-selection information.

In one embodiment, when the processor 1001 executes the acquisition of the first account field that is entered according to the at least one piece of account pre-selection information, it specifically executes the following steps: acquiring the entered key field, and in the account pre-selection information in association with the current positioned region, output the account pre-selection information corresponding to the first account field containing the key field; and acquiring the first account field corresponding to the account pre-selection information that is selected in the account pre-selection information corresponding to the first account field containing the key field.

In some embodiments, when an account is entered, the account is generated by outputting account pre-selection information and acquiring an entered second account field and a first account field entered according to the account pre-selection information. Presetting account pre-selection information may provide prompt information for the user when the user enters an account. Data such as the current positioned region is used to assist the output and the display of the account pre-selection information, thereby improving the accuracy of the prompt information. The input of the first account field can be accomplished just by providing account pre-selection information, thereby simplifying the account input process. The account pre-selection information can be filtered according to a key field entered by the user to narrow the selection range, thereby improving the accuracy of account prompt and improving the convenience of information input to further improve the efficiency of daily transactions.

The account generation terminal provided in some embodiments will be described in detail with reference to FIG. 9 to FIG. 14. It should be noted that, the user terminal shown in FIG. 9 to FIG. 14 is used to execute one or more method illustrated in FIG. 3 and FIG. 4. In order to make it convenient to illustrate, only portions related to the embodiments are illustrated, and the undisclosed specific details please refer to the embodiments shown in FIG. 1 and FIG. 2.

Figure 9:
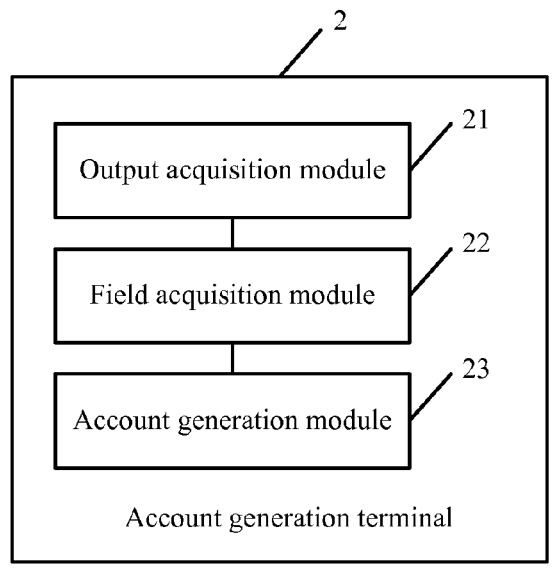
FIG. 9 is a schematic diagram illustrating a structure of an account generation terminal in accordance with some embodiments.

FIG. 9 is a schematic diagram illustrating a structure of an account generation terminal in accordance with some embodiments. The account generation terminal 2 shown in FIG. 9 comprises: an output acquisition module 21, a field acquisition module 22 and an account generation module 23.

The output acquisition module 21 is used to, when a card-like account is recorded, output at least one piece of account pre-selection information, and acquire the first account field that is entered according to the at least one piece of account pre-selection information.

During specific implementation, when a card-like account is recorded, the output acquisition module 21 may output at least one piece of account pre-selection information, to prompt a user to enter a first account field according to the prompt of the at least one piece of account pre-selection information, and also prompt the user to make a selection directly in the at least one piece of account pre-selection information, such that the user may directly click for selection in the at least one piece of account pre-selection information, and the output acquisition module 21 acquires the first account field that is entered according to the at least one piece of account pre-selection information.

Each piece of account pre-selection information in the at least one piece of account pre-selection information comprises the name of the account management mechanism, the account opening geographical location and the account type. The name of the account management mechanism may be specifically the name of the management mechanism that issues the account number (e.g., a bank, etc.). The account opening geographical location may be specifically the specific location of a branch of the account management mechanism that issues the account number (e.g., a branch of AA bank at D region). The account type may be specifically the type of a carrier of the account number (e.g., a deposit card, a platinum card, an international bank, etc.).

When it needs to record a card-like account, the output acquisition module 21 outputs the name of at least one account management mechanism, and acquires the name number corresponding to the name of the account management mechanism that is selected in the name of the at least one account management mechanism. When the output acquisition module 21 acquires the name number corresponding to the name of the selected account management mechanism, the output acquisition module 21 outputs the at least one account opening geographical location associated under the name of the selected account management mechanism, and acquires the location number corresponding to the account opening geographical location that is selected in the at least one account opening geographical location. When the output acquisition module 21 selects the location number corresponding to the account opening geographical location, the output acquisition module 21 then outputs the at least one account type associated under the selected account opening geographical location, and acquires the type numbers corresponding to the account types that are selected in the at least one account type, and the output acquisition module 21 enters the first account field according to the name number, the location number and the type number.

Of course, when the user makes a selection in at least one piece of account pre-selection information, if it needs to narrow the selection range, the user may enter a key field, e.g., enter the first digit of the account number held by the user, the output acquisition module 21 may filter the account pre-selection information beginning with the key field from the at least one piece of account pre-selection information, or filter the account pre-selection information containing the key field, thereby narrowing the selection range of account pre-selection information to improve the accuracy of account prompt.

It should be noted that, the output acquisition module 21 may output and display the first account field after acquiring the first account field, and if the displayed first account field is wrong, the user may manually modify the first account field.

The field acquisition module 22 is used to acquire an entered second account field.

During specific implementation, after the first account field is selected and entered, the user may manually enter a second account field, and the field acquisition module 22 acquires the entered second account field.

The account generation module 23 is used to generate the account number using the second account field and the entered first account field.

During specific implementation, after the account generation module 23 acquires the first account field and the second account field, it may generate the account number using the first account field and the second account field. Preferably, the account generation module 23 may generate the account number when the user sends a confirmation instruction. The user may click a confirmation button displayed in the display screen of the account generation terminal 2 after entering the second account field, to send the confirmation instruction to the account generation terminal 2.

When it needs to make subsequent payments, e.g., make a payment for a target to be paid, or online payment for offline shopping, etc., the target may be tangible goods (e.g., a chair, mineral water, etc.), and may also be intangible goods (e.g., telephone bill, web payment currency, etc.), and the account generation terminal may send, to a transaction system of the account management mechanism to which the account number belongs, a payment request that carries order information, individual information and the account number, the individual information comprising an individual name, a phone number, a payment password, etc., such that the transaction system may carry out identity authentication on the individual information and the account number to determine whether the user identity is the holder of the account number, and determine whether the account number has payment rights. The transaction system carries out payment processing on the order information after the authentication succeeds.

In some embodiments, when a card-like account is recorded, the account number is generated by outputting account pre-selection information and acquiring an entered second account field and a first account field that is entered according to the account pre-selection information. The first account field can be entered just by providing account pre-selection information, thereby simplifying the account number input process. The account pre-selection information can be filtered according to a key field entered by the user to narrow the selection range, thereby improving the accuracy of account prompt and improving the convenience of information input.

Figure 10:
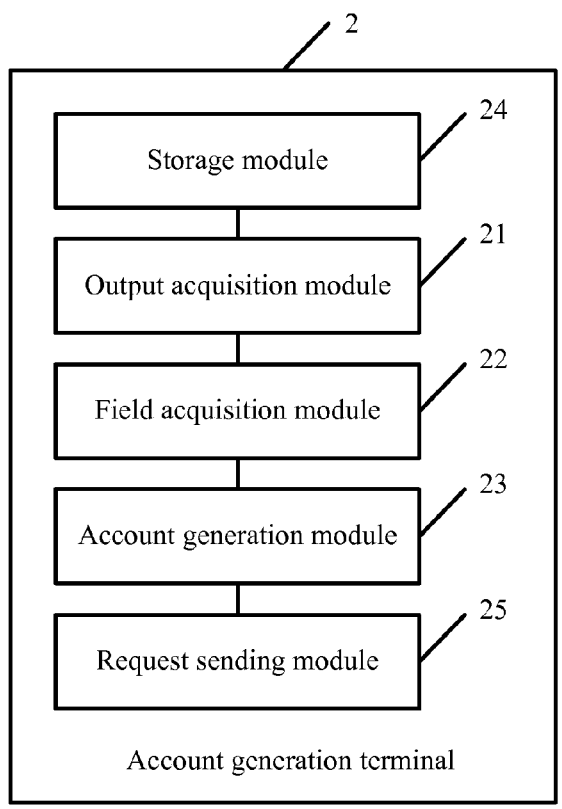
FIG. 10 is a schematic diagram illustrating a structure of another account generation terminal in accordance with some embodiments.

FIG. 10 is a schematic diagram illustrating a structure of another account generation terminal in accordance with some embodiments. The account generation terminal 2 shown in FIG. 10 comprises: an output acquisition module 21, a field acquisition module 22, an account generation module 23, a storage module 24 and a request sending module 25. The structures of the field acquisition module 22 and the account generation module 23 can be made reference to the specific description of the embodiment shown in FIG. 3, which is unnecessary to describe here in details.

The storage module 24 is used to associatively save at least one piece of account pre-selection information and at least one first account field.

During specific implementation, the storage module 24 may associatively save at least one piece of account pre-selection information and at least one first account field in advance, wherein one piece of account pre-selection information corresponds to one first account field.

It should be noted that, each piece of account pre-selection information in the at least one piece of account pre-selection information comprises the name of the account management mechanism, the account opening geographical location and the account type. The name of the account management mechanism may be specifically the name of the management mechanism that issues the account number (e.g., a bank, etc.). The account opening geographical location may be specifically the specific location of a branch of the account management mechanism that issues the account number (e.g., a branch of AA bank at D region). The account type may be specifically the type of a carrier of the account number (e.g., a deposit card, a platinum card, an international bank, etc.). The names of different account management mechanisms correspond to different name numbers, e.g., the name number corresponding to AA bank is 1111, the name number corresponding to BB bank is 1222, etc. In case that the names of the account management mechanisms are the same, different account opening geographical locations correspond to different location numbers, e.g., belonging to AA bank, the location number in D region is 2323, the location number in E region is 2324, etc. However, in case that the names of the account management mechanisms are the same and the account opening geographical locations are the same, different account types also correspond to different type numbers, e.g., belonging to AA bank and the account opening geographical locations being D region, the type number corresponding to a deposit card is 6232, the type number corresponding to a platinum card is 7232, etc.

The storage module 24 associatively saves the names of the account management mechanisms and the name numbers corresponding to the names of the account management mechanisms. Under the name of the account management mechanism, the storage module 24 associatively saves the account opening geographical locations and the location numbers corresponding to the account opening geographical locations. Under the name of the account management mechanism and the account opening geographical location, the storage module 24 associatively saves the account types and the type numbers corresponding to the account types.

The output acquisition module 21 is used to, when a card-like account is recorded, output at least one piece of account pre-selection information, and acquire the first account field that is entered according to the at least one piece of account pre-selection information.

During specific implementation, when a card-like account is recorded, the output acquisition module 21 may output at least one piece of account pre-selection information, to prompt a user to enter a first account field according to the prompt of the at least one piece of account pre-selection information, and also prompt the user to make a selection directly in the at least one piece of account pre-selection information, such that the user may directly click for selection in the at least one piece of account pre-selection information, and the output acquisition module 21 acquires the first account field that is entered according to the at least one piece of account pre-selection information.

Each piece of account pre-selection information in the at least one piece of account pre-selection information comprises the name of the account management mechanism, the account opening geographical location and the account type. The name of the account management mechanism may be specifically the name of the management mechanism that issues the account number (e.g., a bank, etc.). The account opening geographical location may be specifically the specific location of a branch of the account management mechanism that issues the account number (e.g., a branch of AA bank at D region). The account type may be specifically the type of a carrier of the account number (e.g., a deposit card, a platinum card, an international bank, etc.).

When it needs to record a card-like account, the output acquisition module 21 outputs the name of at least one account management mechanism, and acquires the name number corresponding to the name of the account management mechanism that is selected in the name of the at least one account management mechanism. When the output acquisition module 21 acquires the name number corresponding to the name of the selected account management mechanism, the output acquisition module 21 outputs the at least one account opening geographical location associated under the name of the selected account management mechanism, and acquires the location number corresponding to the account opening geographical location that is selected in the at least one account opening geographical location. When the output acquisition module 21 selects the location number corresponding to the account opening geographical location, the output acquisition module 21 then outputs the at least one account type associated under the selected account opening geographical location, and acquires the type numbers corresponding to the account types that are selected in the at least one account type, and the output acquisition module 21 enters the first account field according to the name number, the location number and the type number.

Of course, when the user makes a selection in the at least one piece of account pre-selection information, if it needs to narrow the selection range, the user may enter a key field, e.g., enter the first digit of the account number held by the user, the output acquisition module 21 may filter the account pre-selection information beginning with the key field from the at least one piece of account pre-selection information, or filter the account pre-selection information containing the key field, thereby narrowing the selection range of account pre-selection information to improve the accuracy of account prompt.

It should be noted that, the output acquisition module 21 may output and display the first account field after acquiring the first account field, and if the displayed first account field is wrong, the user may manually modify the first account field.

Figure 11:
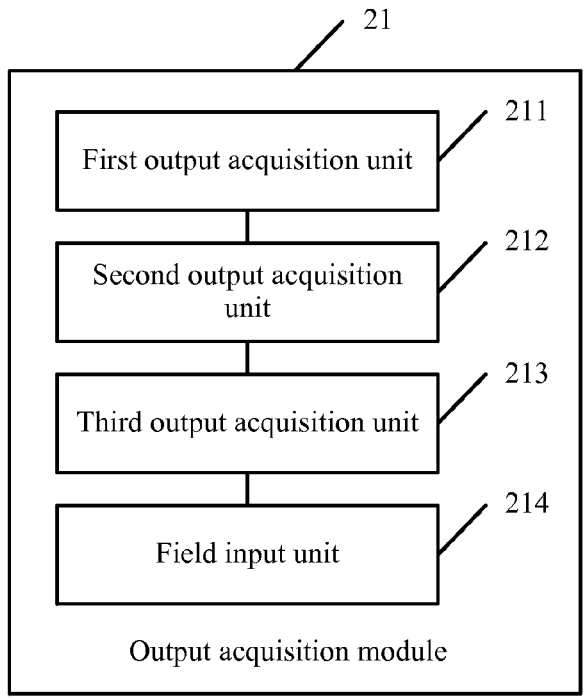
FIG. 11 is a schematic diagram illustrating a structure of still another output acquisition module in accordance with some embodiments.

FIG. 11 is a schematic diagram illustrating a structure of still another output acquisition module in accordance with some embodiments. The output acquisition module 21 shown in FIG. 11 comprises: a first output acquisition unit 211 which is used to, when a card-like account is recorded, output the name of at least one account management mechanism, and acquire the name number corresponding to the name of the account management mechanism that is selected in the name of the at least one account management mechanism.

During specific implementation, when it needs to record a card-like account, the first output acquisition unit 211 may first output the name of at least one account management mechanism. It may be understood that, in order to make it convenient to display, the first output acquisition unit 211 may count the number of users of each account management mechanism, output and display the top several account management mechanism names ordered by the number of users, and the other account management mechanism names may be placed in a same selection label, if the name of the account management mechanism that the user needs to select is not in the several account management mechanism names with the number of users at top, the user may click the selection label to search the desired account management mechanism name.

Alternatively, in order to reduce the time for searching the name of the account management mechanism, the user may enter a first key field in advance. The first key field may be the first character or the first N characters in the name number corresponding to the name of the account management mechanism to which the account number belongs. The first output acquisition unit 211 acquires the entered first key field, outputs the name of the account management mechanism corresponding to the name number containing the first key field in the name number corresponding to the name of the at least one account management mechanism, to allow the user to make a further selection. After the user makes a selection, the first output acquisition unit 211 acquires the name number corresponding to the name of the account management mechanism that is selected in the names of the account management mechanisms corresponding to the name numbers containing the first key field. It should be noted that, if there are many account management mechanism names corresponding to the name numbers containing the first key field, the first output acquisition unit 211 can also performing ranking processing on the names of the account management mechanisms corresponding to the name numbers containing the first key field according to the number of users of the account management mechanism, and output the ranked account management mechanism names corresponding to the name numbers containing the first key field.

The first output acquisition unit 211 acquires the name number corresponding to the name of the account management mechanism that is selected by the user.

Figure 12:
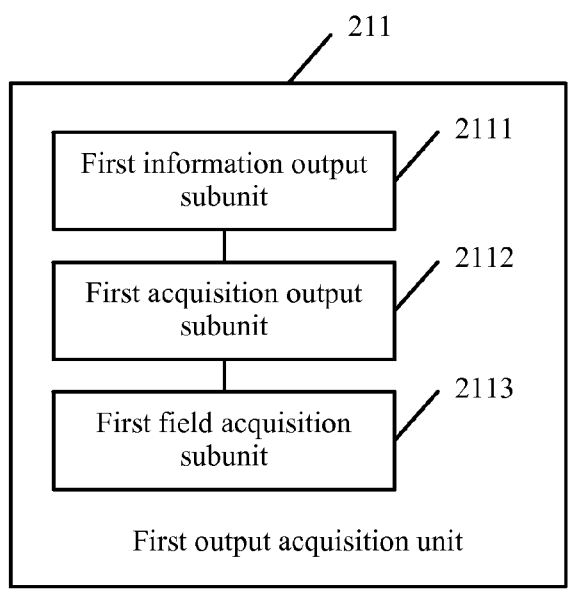
FIG. 12 is a schematic diagram illustrating a structure of a first output acquisition unit in accordance with some embodiments.

FIG. 12 is a schematic diagram illustrating a structure of a first output acquisition unit in accordance with some embodiments. The first output acquisition unit 211 shown in FIG. 12 comprises a first information output subunit 2111 which is used to output the name of at least one account management mechanism when a card-like account is recorded.

The first acquisition output subunit 2112 is used to acquire an entered first key field, and in the name number corresponding to the name of the at least one account management mechanism, output the name of the account management mechanism corresponding to the name number containing the first key field.

The first field acquisition subunit 2113 is used to acquire the name number corresponding to the name of the account management mechanism that is selected in the name of the account management mechanisms corresponding to the name numbers containing the first key field.

During specific implementation, when it needs to record a card-like account, the first information output subunit 2111 may first output the name of at least one account management mechanism. It may be understood that, in order to make it convenient to display, the first information output subunit 2111 may count the number of users of each account management mechanism, output and display the top several account management mechanism names ordered by the number of users, and the other account management mechanism names may be placed in a same selection label, and if the name of the account management mechanism that the user needs to select is not in the several account management mechanism names with the number of users at top, the user may click the selection label to search the desired account management mechanism name.

Alternatively, in order to reduce the time for searching the name of the account management mechanism, the user may enter a first key field in advance. The first key field may be the first character or the first N characters in the name number corresponding to the name of the account management mechanism to which the account number belongs. The first acquisition output subunit 2112 acquires an entered first key field, outputs the name of the account management mechanism corresponding to the name number containing the first key field in the name number corresponding to the name of the at least one account management mechanism, to allow the user to make a further selection. After the user makes a selection, the first field acquisition subunit 2113 acquires the name number corresponding to the name of the account management mechanism that is selected in the name of the account management mechanisms corresponding to the name numbers containing the first key field. It should be noted that, if there are many account management mechanism names corresponding to the name numbers containing the first key field, the first acquisition output subunit 2112 can also performing ranking processing on the names of the account management mechanisms corresponding to the name numbers containing the first key field according to the number of users of the account management mechanism, and output the ranked account management mechanism names corresponding to the name numbers containing the first key field.

The first acquisition output subunit 2112 acquires the name number corresponding to the name of the account management mechanism that is selected by the user.

The second output acquisition unit 212 is used to output at least one account opening geographical location, and acquire the location number corresponding to the account opening geographical location that is selected in the at least one account opening geographical location.

During specific implementation, the second output acquisition unit 212 further outputs the at least one account opening geographical location associated under the name of the selected account management mechanism according to the name of the selected account management mechanism. Preferably, the second output acquisition unit 212 outputs the account opening geographical location that belongs to the current positioned region in the at least one account opening geographical location associated under the name of the selected account management mechanism. The current positioned region may be the current region that is positioned by a GPS tool in the second output acquisition unit 212, e.g., if the current positioned region is Shenzhen, the second output acquisition unit 212 may output the location numbers corresponding to these account opening geographical locations such as Nanshan District, Futian District, Luohu District. It may be understood that, in order to make it convenient to display, the second output acquisition unit 212 may output and display the account opening geographical location of the current positioned region, and other account opening geographical locations may be placed in a same selection label. If the account opening geographical location that the user needs to select is not in the account opening geographical location of the current positioned region, the user may click the selection label to search the account opening geographical location that is needed to select.

Alternatively, in order to reduce the time for searching the account opening geographical location, the user may enter a second key field in advance. The second key field may be the first character or the first N characters in the location number corresponding to the account opening geographical location to which the account number of the user belongs. The second output acquisition unit 212 acquires the entered second key field, and in the location numbers corresponding to the account opening geographical locations that belong to the current positioned region, outputs the account opening geographical location corresponding to the location number containing the second key field, to allow the user to make a further selection. After the user makes a selection, the second output acquisition unit 212 acquires the location number corresponding to the account opening geographical location that is selected in the account opening geographical locations corresponding to the location numbers containing the second key field. It should be noted that, if there are many account opening geographical locations corresponding to the location numbers containing a second key field, the second output acquisition unit 212 can also carry out ranking processing on the filtered location number by the distances of the account opening geographical locations away from the current location of the user, and output the ranked account opening geographical locations corresponding to the location numbers containing the second key field.

The second output acquisition unit 212 acquires the location number corresponding to the account opening geographical location selected by the user.

Figure 13:
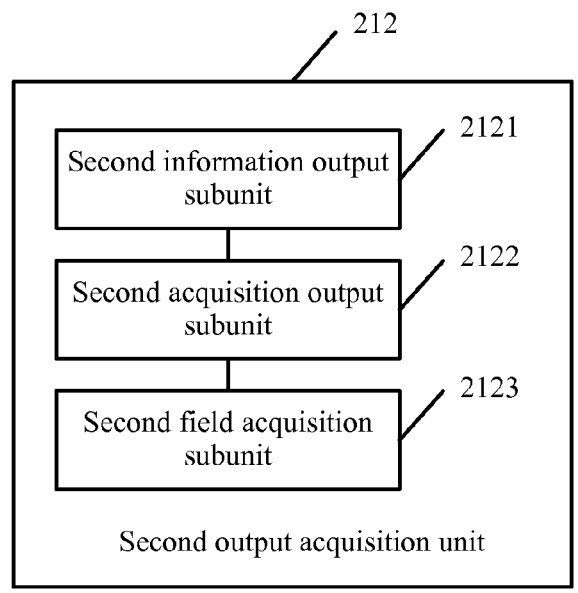
FIG. 13 is a schematic diagram illustrating a structure of a second output acquisition unit in accordance with some embodiments.

FIG. 13 is a schematic diagram illustrating a structure of a second output acquisition unit in accordance with some embodiments. The second output acquisition unit 212 shown in FIG. 13 comprises a second information output subunit 2121 which is used to output the account opening geographical location that belongs to the current positioned region in the at least one account opening geographical location associated under the name of the selected account management mechanism.

The second acquisition output subunit 2122 is used to acquire an entered second key field, and in the location number corresponding to the account opening geographical location that belongs to the current positioned region, output the account opening geographical location corresponding to the location number containing the second key field.

The second field acquisition subunit 2123 is used to acquire the location number corresponding to the account opening geographical location that is selected in the account opening geographical locations corresponding to the location numbers containing the second key field.

During specific implementation, the second information output subunit 2121 further outputs the at least one account opening geographical location associated under the name of the selected account management mechanism according to the name of the selected account management mechanism. Preferably, the second information output subunit 2121 outputs the account opening geographical location that belongs to the current positioned region in the at least one account opening geographical location associated under the name of the selected account management mechanism. The current positioned region may be the current region that is positioned by a GPS tool in the second information output subunit 2121, e.g., if the current positioned region is Shenzhen, the second information output subunit 2121 may output the location numbers corresponding to these account opening geographical locations such as Nanshan District, Futian District, Luohu District. It may be understood that, in order to make it convenient to display, the second information output subunit 2121 may output and display the account opening geographical location of the current positioned region, and other account opening geographical locations may be placed in a same selection label. If the account opening geographical location that the user needs to select is not in the account opening geographical location of the current positioned region, the user may click the selection label to search the account opening geographical location that is needed to select.

Alternatively, in order to reduce the time for searching the account opening geographical location, the user may enter a second key field in advance. The second key field may be the first character or the first N characters in the location number corresponding to the account opening geographical location to which the account number of the user belongs. The second information output subunit 2122 acquires an entered second key field, and in the location numbers corresponding to the account opening geographical locations that belong to the current positioned region, outputs the account opening geographical location corresponding to the location number containing the second key field, to allow the user to make a further selection. After the user makes a selection, the second field acquisition subunit 2123 acquires the location number corresponding to the account opening geographical location that is selected in the account opening geographical locations corresponding to the location numbers containing the second key field. It should be noted that, if there are many account opening geographical locations corresponding to the location numbers containing the second key field, the second acquisition output subunit 2122 can also carry out ranking processing on the filtered location number by the distances of the account opening geographical locations away from the current location of the user, and output the ranked account opening geographical locations corresponding to the location numbers containing the second key field.

The second field acquisition subunit 2123 acquires the location number corresponding to the account opening geographical location selected by the user.

The third output acquisition unit 213 is used to output at least one account type, and acquire the type number corresponding to the account type that is selected in the at least one account type.

During specific implementation, the third output acquisition unit 213 further outputs the at least one account type associated under the selected account opening geographical location according to the name of the selected account management mechanism and the selected account opening geographical location. It may be understood that, in order to make it convenient to display, the third output acquisition unit 213 may preferentially display several account types, and place the other account types in a same selection label. If the account type that the user needs to select is not in the preferentially displayed several account types, the user may click the selection label to search the desired account type.

Alternatively, in order to reduce the time for searching the account type, the user may enter a third key field in advance. The third key field may be the first character or the first N characters in the type number corresponding to the account type to which the account number of the user belongs, the third output acquisition unit 213 acquires an entered third key field, and outputs the account type corresponding to the type number containing the third key field in the type numbers corresponding to the at least one account type to allow the user to make a further selection. After the user makes a selection, the third output acquisition unit 213 acquires the type number corresponding to the account type that is selected in the account types corresponding to the type numbers containing the third key field.

The third output acquisition unit 223 acquires the type number corresponding to the account type selected by the user.

Figure 14:
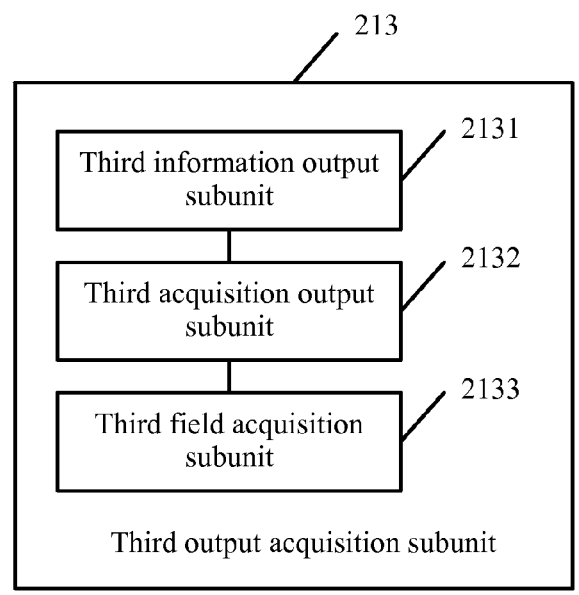
FIG. 14 is a schematic diagram illustrating a structure of a third output acquisition unit in accordance with some embodiments.

FIG. 14 is a schematic diagram illustrating a structure of a third output acquisition unit in accordance with some embodiments. The third output acquisition unit 213 shown in FIG. 14 comprises a third information output subunit 2131 which is used to output the at least one account type associated under the selected account opening geographical location.

The third acquisition output subunit 2132 is used to acquire an entered third key field, and output the account type corresponding to the type number containing the third key field in the type numbers corresponding to the at least one account type.

The third field acquisition subunit 2133 is used to acquire the type number corresponding to the account type that is selected in the account types corresponding to the type numbers containing the third key field.

During specific implementation, the third information output subunit 2131 further outputs the at least one account type associated under the selected account opening geographical location according to the name of the selected account management mechanism and the selected account opening geographical location. It may be understood that, in order to make it convenient to display, the third information output subunit 2131 may preferentially display several account types, and place the other account types in a same selection label. If the account type that the user needs to select is not in the preferentially displayed several account types, the user may click the selection label to search the desired account type.

Alternatively, in order to reduce the time for searching the account type, the user may enter a third key field in advance. The third key field may be the first character or the first N characters in the type number corresponding to the account type to which the account number of the user belongs, the third acquisition output subunit 2132 acquires an entered third key field, and outputs the account type corresponding to the type number containing the third key field in the type numbers corresponding to the at least one account type to allow the user to make a further selection. After the user makes a selection, the third field acquisition subunit 2133 acquires the type number corresponding to the account type that is selected in the account types corresponding to the type numbers containing the third key field.

The third field acquisition subunit 2133 acquires the type number corresponding to the account type selected by the user.

The field output unit 214 is used to enter a first account field according to the name number, the location number and the type number.

Specifically, the field output unit 214 generates an entered first account field according to the acquired name number, location number and type number.

The request sending module 25 is used to send a payment request to a transaction system of the account management mechanism to which the account number belongs, the payment request carrying order information, individual information and the account number, such that the transaction system may carry out identity authentication on the individual information and the account number; therefore, the transaction system carries out payment processing on the order information after the authentication succeeds.

Specifically, when it needs to make subsequent payments, e.g., make a payment for a target to be paid, or online payment for offline shopping, etc., the target may be tangible goods (e.g., a chair, mineral water, etc.), and may also be intangible goods (e.g., telephone bill, web payment currency, etc.), and the request sending module 25 may send, to a transaction system of the account management mechanism to which the account number belongs, a payment request that carries order information, individual information and the account number, the individual information comprising an individual name, a phone number, a payment password, etc., such that the transaction system may carry out identity authentication on the individual information and the account number to determine whether the user identity is the holder of the account number, and determine whether the account number has payment rights. The transaction system carries out payment processing on the order information after the authentication succeeds.

In some embodiments, when a card-like account is recorded, the account number is generated by outputting account pre-selection information and acquiring an entered second account field and a first account field that is entered according to the account pre-selection information. Presetting account pre-selection information may provide prompt information for the user when a card-like account is entered; data such as the number of users and the current positioned region is used to assist the output and display of the account pre-selection information, which improves the accuracy of prompt information; the input of the first account field can be accomplished just by providing account pre-selection information, which simplifies the account number input process; and the account pre-selection information can be filtered according to a key field entered by the user to narrow the selection range, thereby improving the accuracy of account prompt and improving the convenience of information input.

Figure 15:
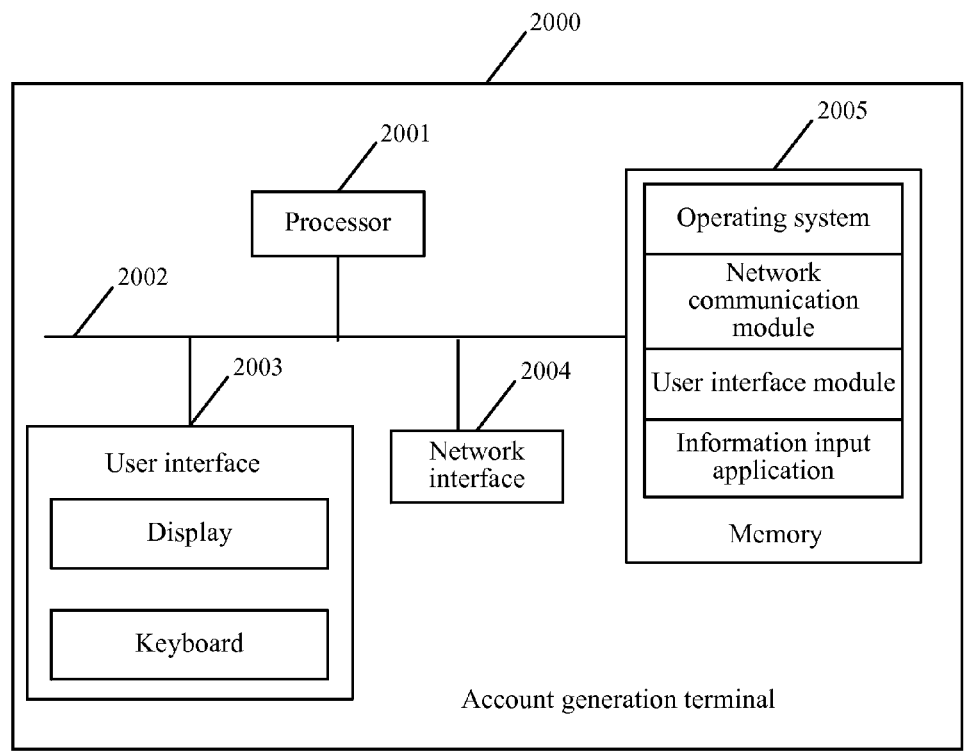
FIG. 15 is a schematic diagram illustrating a structure of another account generation terminal in accordance with some embodiments.

FIG. 15 is a schematic diagram illustrating a structure of another account generation terminal in accordance with some embodiments. The account generation terminal 2000 shown in FIG. 15 comprises: at least one processor 2001, e.g., a CPU, at least one network interface 2004, a user interface 2003, a memory 2005, and at least one communication bus 2002. The communication bus 2002 is used to implement connection and communication among these elements. The user interface 2003 may comprise a display and a keyboard, and optionally the user interface 2003 may also comprise standard wired interfaces and wireless interfaces. Optionally, the network interface 2004 may comprise standard wired interfaces and wireless interfaces (such as a Wi-Fi interface). The memory 2005 may be a high speed random access memory, or may be a non-volatile memory, e.g., at least one magnetic disk memory. Optionally, the memory 2005 may also be at least one storage device located away from the above-mentioned processor 2001. As shown in FIG. 15, the memory 2005, for being used as a computer storage medium, may comprise an operating system, a network communication module, a user interface module and an information input application.

In the account generation terminal 2000 shown in FIG. 15, the network interface 2004 is mainly used to be connected with a transaction system of the account management mechanism to which the account number belongs to carry out data communication with the transaction system. The user interface 2003 is mainly used to provide an input interface for the user to acquire the data output by the user. The processor 2001 can be used to call the information input application stored in the memory 2005, and specifically execute the following steps: when a card-like account is entered, outputting at least one piece of account pre-selection information, and acquiring a first account field that is entered according to the at least one piece of account pre-selection information; acquiring an entered second account field; and generating the account number using the second account field and the entered first account field.

In one embodiment, before performing account input, the processor 2001 also executes the following step: associatively saving at least one piece of account pre-selection information and at least one first account field; wherein one piece of account pre-selection information corresponding to one first account field.

In one embodiment, each piece of account pre-selection information in the at least one piece of account pre-selection information comprises the name of the account management mechanism, the account opening geographical location and the account type. When the processor 2001 executes the output of the at least one piece of account pre-selection information and acquires the first account field that is entered according to the at least one piece of account pre-selection information, it specifically executes the following steps: outputting the name of at least one account management mechanism, and acquire the name number corresponding to the name of the account management mechanism that is selected in the at least one account management mechanism; outputting at least one account opening geographical location, and acquire the location number corresponding to the account opening geographical location that is selected in the at least one account opening geographical location; outputting at least one account type, and acquire the type number corresponding to the account type that is selected in the at least one account type; and entering a first account field according to the name number corresponding to the name of the selected account management mechanism, the location number corresponding to the selected account opening geographical location, and the type number corresponding to the selected account type.

In one embodiment, when the processor 2001 executes the acquisition of the name number corresponding to the name of the account management mechanism that is selected in the name of the at least one account management mechanism, it specifically executes the following steps: acquiring an entered first key field, and in the name number corresponding to the name of the at least one account management mechanism, output the name of the account management mechanism corresponding to the name number containing the first key field; and acquiring the name number corresponding to the name of the account management mechanism that is selected in the name of the account management mechanisms corresponding to the name numbers containing the first key field.

In one embodiment, when the processor 2001 executes the output of the name of the account management mechanism corresponding to the name number containing the first key field, it specifically executes the following step: carrying out ranking processing on the names of the account management mechanisms corresponding to the name numbers containing the first key field according to the number of users of the account management mechanism, and outputting the ranked account management mechanism names corresponding to the name numbers containing the first key field.

In one embodiment, when the processor 2001 executes the output of the at least one account opening geographical location, it specifically executes the following step: outputting the account opening geographical location that belongs to the current positioned region in the at least one account opening geographical location associated under the name of the selected account management mechanism.

In one embodiment, when the processor 2001 executes the acquisition of the location number corresponding to the account opening geographical location that is selected in the at least one account opening geographical location, it specifically executes the following steps: acquiring an entered second key field, and in the location number corresponding to the account opening geographical location that belongs to the current positioned region, output the account opening geographical location corresponding to the location number containing the second key field; and acquiring the location number corresponding to the account opening geographical location that is selected in the account opening geographical locations corresponding to the location numbers containing the second key field.

In one embodiment, when the processor 2001 executes the output of the at least one account type, it specifically executes the following step: outputting the at least one account type associated under the selected account opening geographical location.

In one embodiment, when the processor 2001 executes the acquisition of the type number corresponding to the account type that is selected in the at least one account type, it specifically executes the following steps: acquiring an entered third key field, and output the account type corresponding to the type number containing the third key field in the type numbers corresponding to the at least one account type; and acquiring the type number corresponding to the account type that is selected in the account types corresponding to the type numbers containing the third key field.

In one embodiment, the processor 2001 also executes the following step: sending a payment request to a transaction system of the account management mechanism to which the account number belongs, the payment request carrying order information, individual information and the account number, such that the transaction system may carry out identity authentication on the individual information and the account number; therefore, the transaction system carries out payment processing on the order information after the authentication succeeds.

In some embodiments, when a card-like account is recorded, the account number is generated by outputting account pre-selection information and acquiring an entered second account field and a first account field that is entered according to the account pre-selection information. Presetting account pre-selection information may provide prompt information for the user when a card-like account is entered; data such as the number of users and the current positioned region is used to assist the output and display of the account pre-selection information, which improves the accuracy of prompt information; the input of the first account field can be accomplished just by providing account pre-selection information, which simplifies the account number input process; and the account pre-selection information can be filtered according to a key field entered by the user to narrow the selection range, thereby improving the accuracy of account prompt and improving the convenience of information input.

Figure 16:
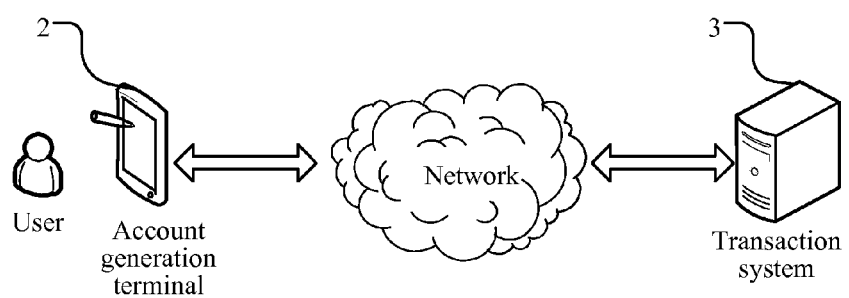
FIG. 16 is a schematic diagram illustrating processing of account information input in accordance with some embodiments.

FIG. 16 is a schematic diagram illustrating processing of account information input in accordance with some embodiments. As shown in FIG. 16, the account generation terminal 2 and the transaction system 3 of the account management mechanism to which the account number belongs are connected with each other via a network. The account generation terminal 2 may be specifically the account generation terminal 2 of the embodiment shown in any one of FIG. 9 to FIG. 13, alternatively, the account generation terminal 2 may be specifically the account generation terminal 2000 of the embodiment shown in FIG. 15.

When a card-like account is recorded, the account generation terminal 2 outputs at least one piece of account pre-selection information, and acquires the first account field that is entered according to the at least one piece of account pre-selection information, and the account generation terminal 2 acquires an entered second account field, and meanwhile generates the account number using the second account field and the entered first account field.

When it needs to make subsequent payments, e.g., make a payment for a target to be paid, or online payment for offline shopping, etc., the target may be tangible goods (e.g., a chair, mineral water, etc.), and may also be intangible goods (e.g., telephone bill, web payment currency, etc.), and the account generation terminal 2 may send, to a transaction system 3 of the account management mechanism to which the account number belongs, a payment request that carries order information, individual information and the account number, the individual information comprising an individual name, a phone number, a payment password, etc., such that the transaction system 3 may carry out identity authentication on the individual information and the account number to determine whether the user identity is the holder of the account number, and determine whether the account number has payment rights. The transaction system 3 carries out payment processing on the order information after the authentication succeeds.

In some embodiments, when a card-like account is recorded, the account number is generated by outputting the account pre-selection information and acquiring an entered second account field and a first account field that is entered according to the account pre-selection information. Presetting account pre-selection information may provide prompt information for the user when a card-like account is entered; data such as the number of users and the current positioned region is used to assist the output and display of the account pre-selection information, which improves the accuracy of prompt information; the input of the first account field can be accomplished just by providing account pre-selection information, which simplifies the account number input process; and the account pre-selection information can be filtered according to a key field entered by the user to narrow the selection range, thereby improving the accuracy of account prompt and improving the convenience of information input.

Figure 17:
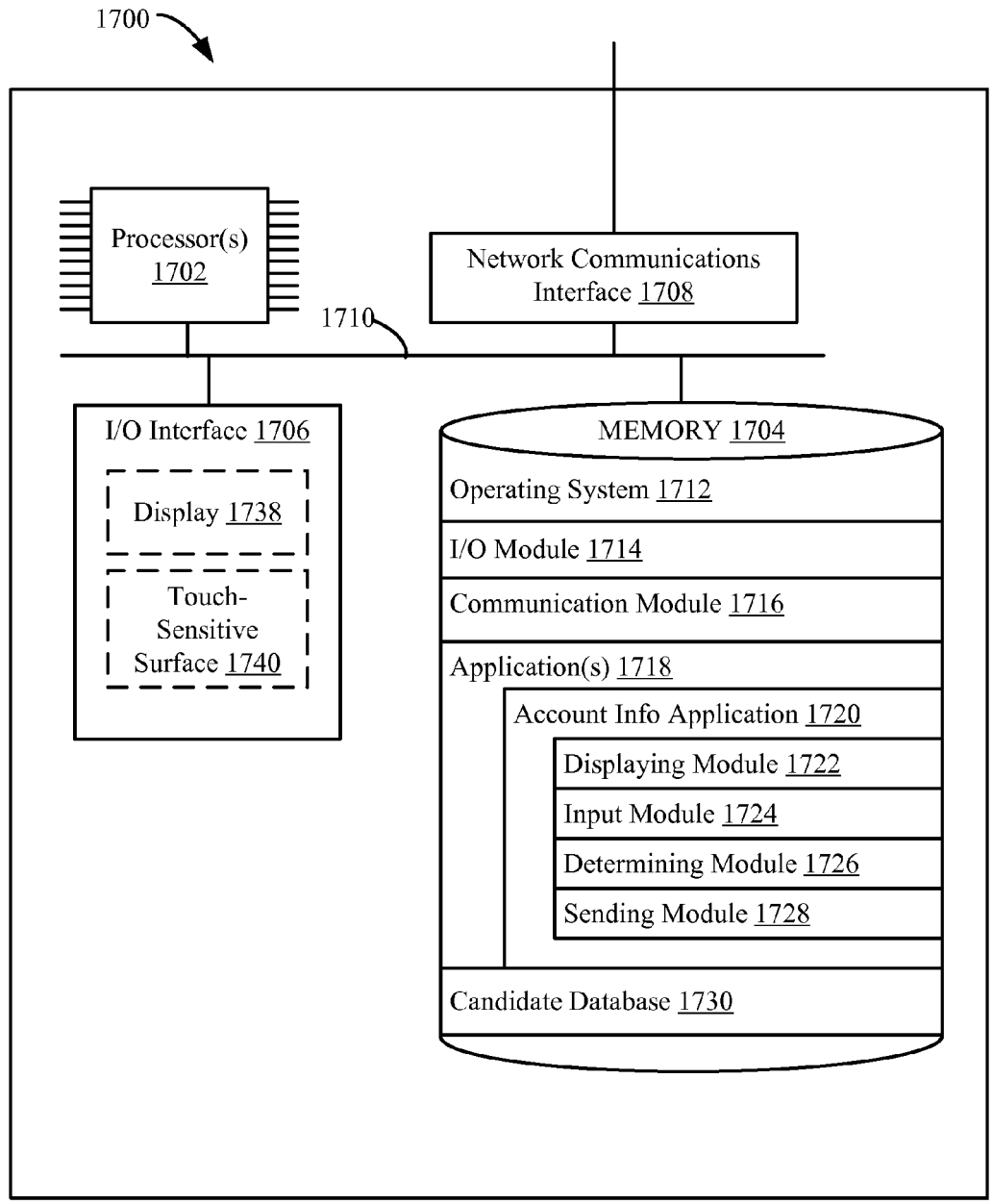
FIG. 17 is a block diagram of an electronic device in accordance with some embodiments.

FIG. 17 is a block diagram of an electronic device 1700 in accordance with some embodiments. In some embodiments, the electronic device 1700 corresponds to the user terminal 1000 described above with respect to FIG. 8. In some embodiments, the electronic device 1700 corresponds to the account generation terminal 2000 described above with respect to FIG. 15.

As shown in FIG. 17, the device 1700 includes one or more processing units (also called herein "processors") 1702, memory 1704, an input/output (I/O) interface 1706, and a network communications interface 1708. These components communicate with one another over one or more communication buses or signal lines 1710. In some embodiments, the memory 1704, or the computer readable storage media of memory 1704, stores programs, modules, instructions, and data structures including all or a subset of: an operating system 1712, an I/O module 1714, a communication module 1716, and one or more applications 1718. The one or more processors 1702 are coupled to the memory 1704 and operable to execute these programs, modules, and instructions, and reads/writes from/to the data structures.

In some embodiments, the processing units 1702 include one or more microprocessors, such as a single core or multi-core microprocessor. In some embodiments, the processing units 1702 include one or more general purpose processors. In some embodiments, the processing units 1702 include one or more special purpose processors.

In some embodiments, the memory 1704 includes high-speed random access memory, such as DRAM, SRAM, DDR RAM or other random access solid state memory devices. In some embodiments the memory 1704 includes non-volatile memory, such as one or more magnetic disk storage devices, optical disk storage devices, flash memory devices, or other non-volatile solid state storage devices. In some embodiments, the memory 1704 includes one or more storage devices remotely located from the processing units 1702. The memory 1704, or alternately the non-volatile memory device(s) within the memory 1704, comprises a computer readable storage medium. In some embodiments, the memory 1704 comprises a non-transitory computer readable storage medium.

In some embodiments, the I/O interface 1706 couples one or more input/output devices, such as one or more displays 1738 (e.g., a touch-sensitive display, also called a touch screen), keyboards, touch-sensitive surfaces 1740 (such as a track pad or a touch-sensitive surface of the touch-sensitive display), speakers, and microphones, to the I/O module 1714 of the device 1700. The I/O interface 1706, in conjunction with the I/O module 1714, receive user inputs (e.g., voice input, keyboard inputs, touch inputs, etc.) and process them accordingly. The I/O interface 1706 and the I/O module 1714 also present outputs (e.g., sounds, images, text, etc.) to the user according to various program instructions implemented on the device 1700.

In some embodiments, the network communications interface 1708 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, WiFi, VoIP, Wi-MAX, or any other suitable communication protocol. The network communications interface 1708 enables communication between the device 1700 with networks, such as the Internet, an intranet and/or a wireless network, such as a cellular telephone network, a wireless local area network (LAN) and/or a metropolitan area network (MAN), and other devices. The communications module 1716 facilitates communications between the device 1700 and other devices (e.g., the payment server 2 illustrated in FIG. 11) over the network communications interface 1708.

In some embodiments, the operating system 1712 (e.g., Darwin, RTXC, LINUX, UNIX, OS X, WINDOWS, iOS, Android, or an embedded operating system such as VxWorks) includes various software components and/or drivers for controlling and managing general system tasks (e.g., memory management, storage device control, power management, etc.) and facilitates communications between various hardware, firmware, and software components.

It should be noted that the device 1700 is only one example, and that the device 1700 may have more or fewer components than shown, may combine two or more components, or may have a different configuration or arrangement of the components. The various components shown in FIG. 17 may be implemented in hardware, software, firmware, including one or more signal processing and/or application specific integrated circuits, or a combination of thereof.

In FIG. 17, the account identifier application 1720 stored in the memory 1704 include the following modules or a subset or a superset thereof:

Displaying Module 1722 configured for displaying information on a display device (e.g., display 1738);

Input Module 1724 configured for receiving input (e.g., user input on a touch-sensitive surface, via a mouse or a keyboard);

Determining Module 1726 configured for determining whether any candidate corresponds to one or more characters; and Sending Module 1728 configured for transmitting an account identifier (e.g., account number) to a remote computer system (e.g., the transaction system 3 in FIG. 16).

In some embodiments, the memory 1704 stores one or more string generation rules 1736. In some embodiments, a string generation rule of the one or more string generation rules 1736 includes information identifying one or more of: a number of entries to be generated, whether each entry consist of numeric characters, non-numeric characters, or both, and a range of each entry (e.g., a number range, or a range of characters, such as from A through F).

Details of the structures, functions, and interactions of these modules are provided with respect to FIGS. 1-16 and 18A-18B and accompanying descriptions.

Figure 18B:
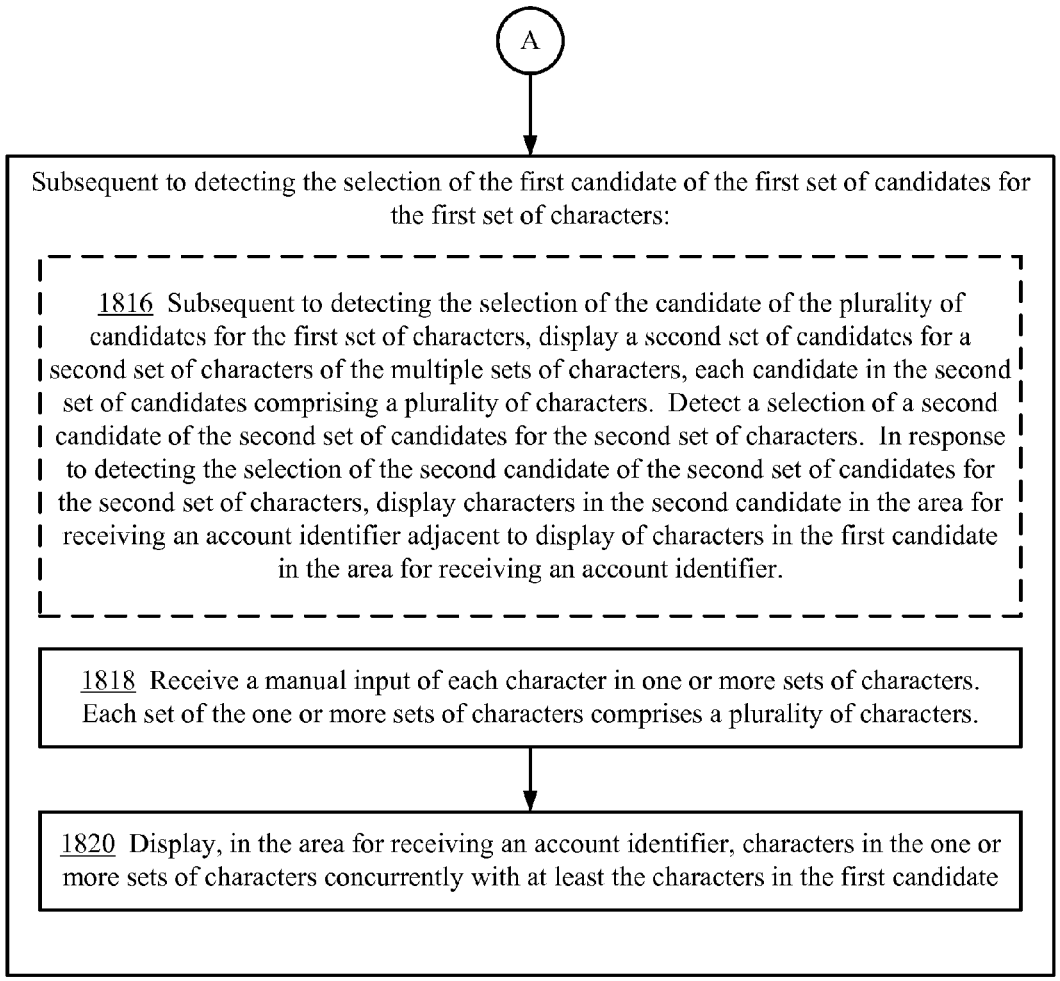
Figure 18B:
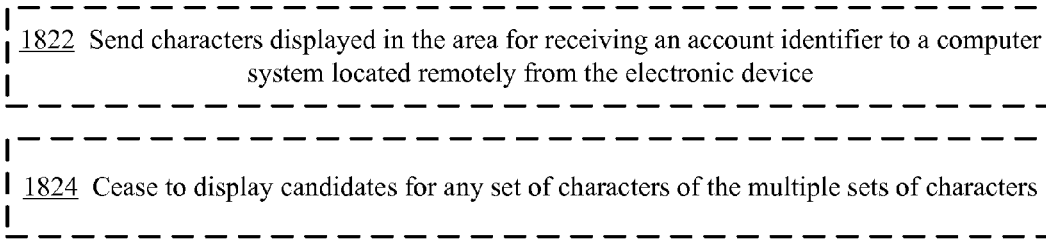

FIGS. 18A-18B illustrate a flow chart of an exemplary method 1800 for receiving an account identifier in accordance with some embodiments.

In some embodiments, the method is performed by an electronic device (e.g., the electronic device 1700 in FIG. 17) with display, memory and one or more processors.

The device displays (1802) a user interface that includes an area for receiving an account identifier (e.g., the user interface illustrated in FIG. 4A includes an area for receiving a payment account number). The account identifier includes multiple sets of characters that do not overlap with one another. For example, in some embodiments, the account identifier is a sixteen digit number split into four sets of characters, each set including four characters (e.g., 1234 5678 9012 3456). In this example, multiple sets of characters refer to "1234," "5678," "9012," and "3456" that do not overlap with one another in the sixteen digit number. In comparison, the first four digits "1234" and four digits starting from the second digit "2345" are deemed to overlap with each other.

The device displays (1804) a first set of candidates for a first set of characters of the multiple sets of characters, each candidate in the first set of candidates comprising a plurality of characters. For example, FIG. 4A shows display of "1111," "1222," "1333" as candidates for the first four digits of the account number.

In some embodiments, the device, prior to detecting the selection of the first candidate of the first set of candidates, receives (1806) a manual input of one or more characters; and replaces the display of the first set of candidates with a subset of the first set of candidates. Candidates in the subset correspond to the one or more characters. For example, as shown in FIG. 4B, a number "1" is manually entered (e.g., using a keyboard, a mouse, or a touch screen), and candidates that start with the manually entered number "1" are displayed. In some embodiments, candidates that start with the one or more characters are deemed to correspond to the one or more characters. In some embodiments, candidates that include the one or more characters are deemed to correspond to the one or more characters.

In some embodiments, the device, prior to detecting the selection of the first candidate of the first set of candidates: determines (1808) that no candidate in the first set of candidates corresponds to the one or more characters; and, in accordance with a determination that no candidate in the first set of candidates corresponds to the one or more characters, foregoes display of any candidate of the first set of candidates. For example, in some embodiments, when a user manually enters "2" and all candidates in the first set of candidates start with "1," no candidate in the first set of candidates is deemed to correspond to the manually entered character "2" and no candidate is displayed.

In some embodiments, the area for receiving an account identifier and the first set of candidates are concurrently displayed (1810) prior to detecting the selection of the first candidate (e.g., FIG. 4A shows that the area for receiving an account identifier and candidates "1111," "1222," "1333" are concurrently displayed).

The device detects (1812) a selection of a first candidate of the first set of candidates for the first set of characters. For example, from a user interface illustrated in FIG. 4A or FIG. 4B, a user may select the candidate labeled "1111" (e.g., using a mouse, a touch screen, etc.).

The device, in response to detecting the selection of the first candidate of the first set of candidates for the first set of characters, displays (1814) characters in the first candidate in the area for receiving an account identifier. For example, FIG. 4C illustrates that in response to detecting the selection of the candidate labeled "1111," the number "1111" is displayed in the area for receiving an account identifier.

In some embodiments, the device, subsequent to detecting the selection of the candidate of the plurality of candidates for the first set of characters, displays (1816) a second set of candidates for a second set of characters of the multiple sets of characters, each candidate in the second set of candidates comprising a plurality of characters. For example, FIG. 4C illustrates that the second set of candidates "2323," "2324," and "2325" are displayed for the second set of characters (e.g., fifth through eighth digits of the account number). In some embodiments, the second set of characters is distinct from the first set of characters. The device detects a selection of a second candidate of the second set of candidates for the second set of characters; and, in response to detecting the selection of the second candidate of the second set of candidates for the second set of characters, displays characters in the second candidate in the area for receiving an account identifier adjacent to display of characters in the first candidate in the area for receiving an account identifier. For example, FIG. 4E shows that, in response to detecting the selection of the candidate labeled "2323," the number "2323" is displayed in the area for receiving an account identifier adjacent to the number "1111" already displayed in the area for receiving an account identifier.

Subsequent to detecting the selection of the first candidate of the first set of candidates for the first set of characters, the device receives (1818) a manual input of each character in one or more sets of characters. Each set of the one or more sets of characters comprises a plurality of characters. For example, FIG. 4H illustrates that the last four digits of the account number "3888" are manually entered individually (e.g., a manual entry of "3," followed by a manual entry of "8," followed by another manual entry of "8," followed by third manual entry of "8").

The device displays (1820), in the area for receiving an account identifier, characters in the one or more sets of characters concurrently with at least the characters in the first candidate. For example, FIG. 4H illustrates that the manually entered characters "3888" are concurrently displayed in the area for receiving an account identifier with previously entered characters, including characters "1111" of the first candidate.

In some embodiments, the device sends (1822) characters displayed in the area for receiving an account identifier to a computer system located remotely from the electronic device. In some embodiments, the characters entered (e.g., via manual individual entry, such as typing, and by selection of one or more candidates) into the area for receiving an account identifier are deemed to be the account identifier. In some embodiments, the device sends the characters, displayed in the area for receiving an account identifier, as the account identifier to a transaction system (e.g., the transaction system 3 shown in FIG. 16).

In some embodiments, the device ceases (1824) to display candidates for any set of characters of the multiple sets of characters. In some embodiments, the device ceases to display any candidate when the device is receiving user input for a last set of characters. In some embodiments, the device ceases to display any candidate when there is no candidate for a corresponding set of characters.

While particular embodiments are described above, it will be understood they are not intended to limit the scope of claims to these particular embodiments only. On the contrary, the scope of claims will cover alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although the terms "first" and "second" are used herein to describe various elements, these elements should not be limited by these terms. These terms are used only to distinguish one element from another. For example, a first candidate could be termed a second candidate, and, similarly, a second candidate could be termed a first candidate, without departing from the scope of claims. The first candidate and the second candidate are both candidates, but they are not the same candidate.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method for receiving an account identifier, performed by an electronic device with display, memory and one or more processors, the method comprising: displaying a user interface that includes an area for receiving an account identifier identifying an account of an account holder, wherein the account identifier includes multiple sets of characters that do not overlap with one another; displaying a first set of candidates for a first set of characters of the multiple sets of characters, each candidate in the first set of candidates comprising a plurality of characters; detecting a selection, by a user of the electronic device, of a first candidate of the first set of candidates for the first set of characters; in response to detecting the selection of the first candidate of the first set of candidates for the first set of characters, displaying characters in the first candidate in the area for receiving an account identifier; subsequent to detecting the selection of the first candidate of the first set of candidates for the first set of characters, determining a current geographical location of the electronic device; displaying a second set of candidates for a second set of characters of the multiple sets of characters, each candidate in the second set of candidates comprising a plurality of characters and corresponding to a respective geographical location selected based on the determined current geographical location of the electronic device, wherein the candidates in the second set of candidates are ranked according to their respective distances from the determined current geographical location and displayed according to the ranking; detecting a selection by the user of a second candidate of the second set of candidates for the second set of characters; in response to detecting the selection of the second candidate of the second set of candidates for the second set of characters, displaying characters in the second candidate in the area for receiving an account identifier adjacent to display of characters in the first candidate in the area for receiving an account identifier; subsequent to detecting the selection of the second candidate of the second set of candidates for the second set of characters, determining that the electronic device has received user input for all but a last set of characters; in accordance with a determination that the electronic device has received user input for all but the last set of characters: ceasing to display candidates for any set of characters of the multiple sets of characters so as to require manual entry of the last set of characters, wherein the last set of characters comprises a plurality of characters; receiving manual entry of each respective character in the last set of characters; and displaying, in the area for receiving an account identifier, manually entered characters in the last set of characters; subsequent to receiving manual entry of each respective character in the last set of characters, receiving, from the user, a confirmation instruction; and in response to receiving the confirmation instruction, sending a request to perform a transaction using the account identified by the account identifier to an account management system that manages the account, wherein the request includes the account identifier and individual information of the user, and wherein the account management system is configured to authenticate the transaction in accordance with a determination that the individual information matches information of the account holder.

2. The method of claim 1, further comprising:
prior to detecting the selection of the first candidate of the first set of candidates:
receiving a manual input of one or more characters; and
replacing the display of the first set of candidates with a subset of the first set of candidates, wherein candidates in the subset correspond to the one or more characters.

3. The method of claim 2, further comprising:
prior to detecting the selection of the first candidate of the first set of candidates:
determining that no candidate in the first set of candidates corresponds to the one or more characters; and,
in accordance with a determination that no candidate in the first set of candidates corresponds to the one or more characters, forgoing display of any candidate of the first set of candidates.

4. The method of claim 1, wherein the area for receiving an account identifier and the first set of candidates are concurrently displayed prior to detecting the selection of the first candidate.

5. An electronic device for receiving an account identifier, comprising: display; one or more processors; and memory storing one or more programs for execution by the one or more processors, the one or more programs including instructions for: displaying a user interface that includes an area for receiving an account identifier identifying an account of an account holder, wherein the account identifier includes multiple sets of characters that do not overlap with one another; displaying a first set of candidates for a first set of characters of the multiple sets of characters, each candidate in the first set of candidates comprising a plurality of characters; detecting a selection, by a user of the electronic device, of a first candidate of the first set of candidates for the first set of characters; in response to detecting the selection of the first candidate of the first set of candidates for the first set of characters, displaying characters in the first candidate in the area for receiving an account identifier; subsequent to detecting the selection of the first candidate of the first set of candidates for the first set of characters, determining a current geographical location of the electronic device; displaying a second set of candidates for a second set of characters of the multiple sets of characters, each candidate in the second set of candidates comprising a plurality of characters and corresponding to a respective geographical location selected based on the determined current geographical location of the electronic device, wherein the candidates in the second set of candidates are ranked according to their respective distances from the determined current geographical location and displayed according to the ranking; detecting a selection by the user of a second candidate of the second set of candidates for the second set of characters; in response to detecting the selection of the second candidate of the second set of candidates for the second set of characters, displaying characters in the second candidate in the area for receiving an account identifier adjacent to display of characters in the first candidate in the area for receiving an account identifier; subsequent to detecting the selection of the second candidate of the second set of candidates for the second set of characters, determining that the electronic device has received user input for all but a last set of characters; in accordance with a determination that the electronic device has received user input for all but the last set of characters; ceasing to display candidates for any set of characters of the multiple sets of characters so as to require manual entry of the last set of characters, wherein the last set of characters comprises a plurality of characters; receiving manual entry of each respective character in the last set of characters; and displaying, in the area for receiving an account identifier, manually entered characters in the last set of characters; subsequent to receiving manual entry of each respective character in the last set of characters, receiving, from the user, a confirmation instruction; and in response to receiving the confirmation instruction, sending a request to perform a transaction using the account identified by the account identifier to an account management system that manages the account, wherein the request includes the account identifier and individual information of the user, and wherein the account management system is configured to authenticate the transaction in accordance with a determination that the individual information matches information of the account holder.

6. The device of claim 5, wherein the one or more programs include instructions for:
prior to detecting the selection of the first candidate of the first set of candidates:
receiving a manual input of one or more characters; and
replacing the display of the first set of candidates with a subset of the first set of candidates, wherein candidates in the subset correspond to the one or more characters.

7. The device of claim 6, wherein the one or more programs include instructions for:
prior to detecting the selection of the first candidate of the first set of candidates:
determining that no candidate in the first set of candidates corresponds to the one or more characters; and,
in accordance with a determination that no candidate in the first set of candidates corresponds to the one or more characters, forgoing display of any candidate of the first set of candidates.

8. The device of claim 5, wherein the area for receiving an account identifier and the first set of candidates are concurrently displayed prior to detecting the selection of the first candidate.

9. A non-transitory computer readable storage medium storing one or more programs for execution by one or more processors of a portable electronic device, the one or more programs including instructions for: displaying a user interface that includes an area for receiving an account identifier identifying an account of an account holder, wherein the account identifier includes multiple sets of characters that do not overlap with one another; displaying a first set of candidates for a first set of characters of the multiple sets of characters, each candidate in the first set of candidates comprising a plurality of characters; detecting a selection, by a user of the electronic device, of a first candidate of the first set of candidates for the first set of characters; in response to detecting the selection of the first candidate of the first set of candidates for the first set of characters, displaying characters in the first candidate in the area for receiving an account identifier; subsequent to detecting the selection of the first candidate of the first set of candidates for the first set of characters, determining a current geographical location of the electronic device; displaying a second set of candidates for a second set of characters of the multiple sets of characters, each candidate in the second set of candidates comprising a plurality of characters and corresponding to a respective geographical location selected based on the current geographical location of the electronic device, wherein the candidates in the second set of candidates are ranked according to their respective distances from the determined current geographical location and displayed according to the ranking; detecting a selection by the user of a second candidate of the second set of candidates for the second set of characters; in response to detecting the selection of the second candidate of the second set of candidates for the second set of characters, displaying characters in the second candidate in the area for receiving an account identifier adjacent to display of characters in the first candidate in the area for receiving an account identifier; subsequent to detecting the selection of the second candidate of the second set of candidates for the second set of characters, determining that the electronic device has received user input for all but a last set of characters; in accordance with a determination that the electronic device has received user input for all but the last set of characters: ceasing to display candidates for any set of characters of the multiple sets of characters so as to require manual entry of the last set of characters, wherein the last set of characters comprises a plurality of characters; receiving manual entry of each respective character in the last set of characters; and displaying, in the area for receiving an account identifier, manually entered characters in the last set of characters; subsequent to receiving manual entry of each respective character in the last set of characters, receiving, from the user, a confirmation instruction; and in response to receiving the confirmation instruction, sending a request to perform a transaction using the account identified by the account identifier to an account management system that manages the account, wherein the request includes the account identifier and individual information of the user, and wherein the account management system is configured to authenticate the transaction in accordance with a determination that the individual information matches information of the account holder.

10. The computer readable storage medium of claim 9, wherein the one or more programs include instructions for:
prior to detecting the selection of the first candidate of the first set of candidates:
receiving a manual input of one or more characters; and
replacing the display of the first set of candidates with a subset of the first set of candidates, wherein candidates in the subset correspond to the one or more characters.

11. The computer readable storage medium of claim 10, wherein the one or more programs include instructions for:
prior to detecting the selection of the first candidate of the first set of candidates:
determining that no candidate in the first set of candidates corresponds to the one or more characters; and,
in accordance with a determination that no candidate in the first set of candidates corresponds to the one or more characters, forgoing display of any candidate of the first set of candidates.

12. The computer readable storage medium of claim 9, wherein the area for receiving an account identifier and the first set of candidates are concurrently displayed prior to detecting the selection of the first candidate.

\* \* \* \* \*